United States Patent

Horimai et al.

[11] Patent Number: 5,717,667
[45] Date of Patent: Feb. 10, 1998

[54] OPTICAL PICKUP APPARATUS INCLUDING AN OPTICAL ROTATION DEVICE

[75] Inventors: Hideyoshi Horimai; Tsunehiro Maruo, both of Kanagawa, Japan

[73] Assignee: Sony Corporation, Tokyo, Japan

[21] Appl. No.: 783,654

[22] Filed: Jan. 15, 1997

Related U.S. Application Data

[62] Division of Ser. No. 491,910, PCT/JP94/01968 filed Nov. 21, 1994.

[30] Foreign Application Priority Data

Nov. 11, 1993 [JP] Japan ..................... 5-290497

[51] Int. Cl.$^6$ .............................. G11B 7/095
[52] U.S. Cl. .................. 369/44.23; 369/44.37; 369/110; 369/112
[58] Field of Search ............... 369/44.14, 44.23–44.24, 369/44.26, 44.37, 44.41, 54, 110, 112

[56] References Cited

U.S. PATENT DOCUMENTS

| | | | |
|---|---|---|---|
| 5,231,620 | 7/1993 | Ohuchida | 369/44.37 X |
| 5,297,125 | 3/1994 | Yamagami et al. | 369/44.26 X |
| 5,483,509 | 1/1996 | Yang et al. | 369/44.41 X |

FOREIGN PATENT DOCUMENTS

| | | |
|---|---|---|
| 0 579 843 A1 | 1/1994 | European Pat. Off. |
| 57-88540 | 6/1982 | Japan |
| 58-118036 | 7/1983 | Japan |
| 59-79446 | of 1984 | Japan |
| 59-96551 | 6/1984 | Japan |
| 59-121637 | 7/1984 | Japan |
| 59-191156 | 10/1984 | Japan |
| 61-90346 | 5/1986 | Japan |
| 61-160852 | 7/1986 | Japan |
| 62-66452 | 3/1987 | Japan |
| 63-138533 | 6/1988 | Japan |
| 63-200346 | 8/1988 | Japan |
| 63-247941 | 10/1988 | Japan |
| 63-291238 | 11/1988 | Japan |
| 1-55746 | 3/1989 | Japan |
| 1-55747 | 3/1989 | Japan |
| 64-55745 | 3/1989 | Japan |
| 1-315036 | 12/1989 | Japan |
| 6-162547 | 6/1994 | Japan |

*Primary Examiner*—W. R. Young
*Attorney, Agent, or Firm*—Limbach & Limbach LLP

[57] ABSTRACT

An optical pickup device suitable for use as an optical system of; e.g., an optical disc reproducing apparatus, for carrying out reproduction of desired information on an optical disc; e.g., a magneto-optical disc, a compact disc (CD) or a video disc. The device uses diffraction and various optical rotation devices to direct the incident and reflected light rays to the optical disk and to photodetectors. More specifically, light emitted by a laser source is trisected into 0-th and ±1-th order light. The rays are then rotated by an optical rotation device. The rays are converged on the optical disk, reflected, and then rotated again. The rays are then deflected to a photodetector, which then produces light quantity detection signals; e.g., tracking error signal.

24 Claims, 19 Drawing Sheets

CD SIGNAL=A+B+C+D
MO SIGNAL=(A+B)-(C+D)
FOCUS ERROR=(A+C)-(B+D)
RF SIGNAL=A+B+C+D
TRACKING ERROR=(E+F)-(G+H)
TRACKING ERROR=(A+D)-(B+C)
TRACKING ERROR
={(A+D)-(B+C)}-k{E-F)+(G-H)}

$\sin(2\alpha+\theta k)$ $\sin(-2\alpha+\theta k)$

MO SIGNAL=(A+B+C+D)-(E+F+G+H)
FOCUS ERROR SIGNAL={(A+E+D+H)+(N+O)}-{(B+C+F+G)+(M+P)}
PUSH-PULL SIGNAL=(A+B+E+F+O+P)-(C+D+G+H+M+N)
DIFFERENTIAL PUSH-PULL SIGNAL
={(A+B+E+F+O+P)-(C+D+G+H+M+N)}-K{(I+J+Q+R)+(K+L+S+T)}
TRACKING ERROR BY THREE SPOT METHOD
=(I+J+Q+R)-(K+L+S+T)
RF SIGNAL=M+N+O+P

MO SIGNAL=(A+B)-(C+D)

IN FOCUS    TOO NEAR    TOO FAR

FOCUS ERROR SIGNAL=A-B
TRACKING ERROR SIGNAL=D-E
RF SIGNAL=A+B+C
MO SIGNAL=(A+B)-C

MO SIGNAL=(I+J)-(K+L)
RF SIGNAL=A+B+C+D
PUSH-PULL SIGNAL=(A+B)-(C+D)
DIFFERENTIAL PUSH-PULL SIGNAL
=(A+B)-(C+D)-k{(E+F)+(G+H)}
TRACKING ERROR SIGNAL
 BY THREE SPOT METHOD
=(E+F)-(G+H)

MO SIGNAL=M-N
FOCUS ERROR SIGNAL=(A+B+C+D+E+F)-(G+H+I+J+K+L)
PUSH-PULL SIGNAL={(A+B+C)+(J+K+L)}-{(D+E+F)+(G+H+I)}
DIFFERENTIAL PUSH-PULL SIGNAL={(A+B+C)+(J+K+L)}
-{(D+E+F)+(G+H+I)}-K(O+P+Q+R+S+T+U+V)
RF SIGNAL=A+B+C+D+E+F+G+H+I+J+K+L

OPTICAL PICKUP APPARATUS INCLUDING AN OPTICAL ROTATION DEVICE

This is a divisional of application Ser. No. 08/491,910, filed Jul. 18, 1995, now pending, which is a 371 of PCT/JP94/01968 filed Nov. 21, 1994.

TECHNICAL FIELD

This invention relates to an optical pick-up device suitable when used as an optical system of an optical disc recording apparatus, an optical disc reproducing apparatus, or an optical disc recording/reproducing apparatus, etc. for carrying out recording/reproduction of desired record information onto an optical disc, e.g., a magneto-optical disc, a compact disc (CD) or a video disc, etc.

BACKGROUND ART

A conventional optical pick-up device for magneto-optical disc has a configuration as shown in FIG. 22. At the time of reproduction (or at the time of recording), laser beams of so called P polarization component are emitted from a laser diode 201. These laser beams are changed into rays of parallel light by a collimator lens 201a, and are caused to undergo shaping by a shaping prism 202. The rays of light thus shaped are incident to a S polarization beam splitter 203.

A polarization beam splitter film 203a provided at the S polarization beam splitter 203 has the characteristic that it allows 100% of rays of light of S polarization component having polarization direction perpendicular to the P polarization component to be reflected, and allows 50% of rays of light of P polarization component to be reflected and allows the remaining 50% thereof to be transmitted therethrough. For this reason, one half of the laser beams of the P polarization component incident to the S polarization beam splitter 203 are reflected and the remaining half thereof are transmitted therethrough. The laser beams transmitted through the S polarization beam splitter 203 are reflected by a 45 degree mirror 204A, and are irradiated onto a magneto-optical disc 206 through an object lens (objective) 205.

In this example, at the time of recording, data is delivered to a magnetic head 208 through an input terminal 207. Thus, the magnetic head 208 is driven in accordance with the data, so a magnetic field corresponding to the data is produced. This magnetic field is applied to the portion where laser beams are irradiated of the magneto-optical disc 208. Thus, recording of data is carried out.

When laser beams are irradiated onto the magneto-optical disc 206 as described above, a reflected light is produced. Rays of this reflected light are reflected by the 45 degree mirror 204A through the object lens 205, and are incident to the S polarization beam splitter 203.

The rays of reflected light are reflected in a manner deviating with respect to the S polarization component in accordance with data recorded on the magneto-optical disc 206. However, such deviation quantity is very small, and most of such rays of light are reflected as the P polarization component. The S polarization beam splitter 203 allows 100% of rays of the S polarization component to be reflected, and allows 50% of rays of the P polarization component to be reflected and allows the remaining 50% to be transmitted therethrough as described above. For this reason, rays of reflected light of the S polarization component of the rays of the reflected light are all reflected by the S polarization beam splitter 203 and are incident to a polarization beam splitter 204. On the other hand, one half of rays of reflected light of the P polarization component are reflected and the remaining half are transmitted therethrough by the S polarization beam splitter 203.

A polarization beam splitter film 204a of the polarization beam splitter 204 has the characteristic that it allows all of rays of light of the P polarization component to be transmitted therethrough and allows all of rays of light of the S polarization component to be reflected. For this reason, rays of the reflected light of the P polarization component of the rays of reflected light incident to the polarization beam splitter 204 are transmitted through the polarization beam splitter film 204a and are incident to a servo signal detection system 213. Moreover, rays of the light of the S polarization component are reflected by the polarization beam splitter film 204a and are incident to a data detection system 214.

The rays of reflected light of P polarization component incident to the servo signal detection system 213 are converged through a lens 210 and a cylindrical lens 211, and are irradiated onto a photodetector 212 for detection of servo signal. The photodetector 212 receives the reflected light of P polarization component to deliver a light quantity detection signal corresponding to the received light quantity to servo signal detecting circuit (not shown). The servo signal detecting circuit detects, on the basis of the light quantity detection signal, a focus error and a tracking error to deliver both a signal indicative of the detected focus error and a signal indicative of the detected tracking error to servo control circuit (not shown). The servo control circuit carries out a tracking error control and a focus error control on the basis of the focus error signal and the tracking error signal. Thus, it is possible to carry out data reproduction, etc. under the state of just track and just focus (in focus) at all times.

In a manner stated above, in the S polarization beam splitter 203, 50% of rays of a light of the P polarization component are reflected and the remaining 50% are transmitted therethrough. In the servo signal detection system 213, a tracking error and a focus error are detected on the basis of a reflected light of P polarization component reflected by the S polarization beam splitter 203. In this case, since most of the rays of the reflected light are reflected as the P polarization component, even if the above-mentioned S polarization beam splitter 203 is adapted to allow 50% of rays of light of the P polarization component to be reflected and to allow the remaining 50% to be transmitted therethrough, it is possible to detect such tracking error and or focus error by a sufficient light quantity.

On the other hand, ray of reflected light of S polarization component reflected by the polarization beam splitter 204 are converted (changed) into rays of a reflected light of P polarization component by a λ/2 plate 205 of the data detection system 214, and are incident to a polarization beam splitter 207. A polarization beam splitter film 207a of the polarization beam splitter 207 has the characteristic that it allows 50% of rays of light the P polarization component to be reflected and to allows the remaining 50% thereof to be transmitted therethrough. For this reason, rays of the reflected light of the P polarization component incident to the polarization beam splitter 207 are divided into two (groups of) rays of light by the polarization beam splitter 207, and the rays of light thus halved are respectively irradiated onto photodetectors 208, 209 for detection of data.

The respective photodetectors 208, 209 respectively receive the above-mentioned two (groups of) rays of reflected light to deliver light quantity detection signals corresponding to the received light quantities to data detecting circuit (not shown). The data detecting circuit detects data on the basis of the respective light quantity detection signals to deliver the data thus detected to a data processing system. The data processing system implements a predetermined data processing to the data to deliver, at the time of reproduction, such processed data to external equipment such as a computer system or a speaker system, etc.

Thus, in the computer system and/or the speaker system, etc., data reproduced from the magneto-optical disc 206 is suitably processed.

However, since the above-described conventional optical pick-up device for magneto-optical disc is adapted to separate laser beams and rays of reflected light by using polarization beam splitters 203, 204, 207 to detect data, focus error and/or tracking error, etc., there result increased number of parts and increased cost. In addition, since there is a necessity of ensuring light path for rays of reflected light, etc. separated at the polarization beam splitters 203, 204, 207, the optical pick-up device itself was disadvantageously large-sized.

Moreover, in the above-mentioned polarization beam splitter 204, reflection and transmission of rays of light of the P polarization component were caused to be respectively 50%. In this case, the reflection factor is set on the basis of light quantity irradiated to the servo signal detection system 213 and shot noise of the photodetector 212 for detection of servo signal or noise resulting from double refraction, etc. of magneto-optical disc. The coupling efficiency and the S/N ratio have the trade-off relationship. For this reason, there is the problem that if the coupling efficiency is caused to be higher, the S/N ratio is lowered, and conversely if the S/N ratio is caused to be high, the coupling efficiency is lowered.

In addition, it is expected that optical pick-up devices capable of reproducing not only data recorded by light and magnetism like magneto-optical disc, but also data recorded as prepits like compact disc will be developed.

This invention has been made in view of such actual circumstances, and its object is to provide such an optical pick-up device to allow the polarization beam splitter to become unnecessary to permit, through reduction of the number of pars, reduction of cost of the device and realization of the device of compact structure, to permit coping (dealing) with reproduction of the magneto-optical disc and reproduction of the compact disc, and to permit reproduction of data recorded on the magneto-optical disc and the compact disc with good coupling efficiency and S/N ratio.

DISCLOSURE OF THE INVENTION

An optical pick-up device according to this invention comprises: a laser light source for emitting laser beams as an incident light; diffraction means for separating the incident light into a 0-th order light, a +1-th order light and a −1-th order light spaced by predetermined distances in a radial direction of an optical disc; and a right optical rotation section for rotating plane of polarization of an incident light incident thereto by a predetermined angle in a clockwise direction. Moreover, the optical pick-up device includes: optical rotation means comprised of the right optical rotation section and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light; and a lens member interposed between the optical rotation means and the optical disc and adapted to converge rays of the incident light which has been passed through the optical rotation means to irradiate them onto the optical disc and to allow rays of a reflected light produced as the result of the fact that those rays of the incident light are irradiated onto the optical disc to be transmitted therethrough. Further, the optical pick-up device includes a polarization beam splitter interposed between the diffraction means and the optical rotation means and adapted to allow a light of a predetermined polarization component of laser beams incident thereto to be passed therethrough and to allow a light of a polarization component perpendicular to the predetermined polarization component to be reflected to thereby emit the incident light and the reflected light in different directions; and detecting means adapted to receive the reflected light separated from the incident light by the polarization beam splitter to detect at least a magneto-optical signal and a tracking error signal in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned detecting means is formed by first light receiving means consisting of four light receiving areas for receiving the 0-th order light, second light receiving means consisting of two light receiving areas for receiving the +1-th order light, and third light receiving means consisting of two light receiving areas for receiving the −1-th order light, thus to detect at least a magneto-optical signal and a tracking error signal on the basis of light receiving results of the respective light receiving means.

Thus, it is possible to cope with, by so called three method, all (various) optical discs such as magneto-optical disc, write once disc, compact disc, and video disc, etc.

Moreover, since only one polarization beam splitter is used, reduction of the optical path can be realized, and the optical pick-up device itself can become compact. In addition, simplification of the configuration and low cost of the optical pick-up device can be realized through reduction of the number of parts.

Further, an optical pick-up device according to this invention comprises a laser light source for emitting laser beams as an incident light; diffraction means for separating the incident light into a 0-th order light, a +1-th order light and a −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical pick-up device includes a lens member interposed between the optical rotation means and the optical disc and adapted to converge rays of the incident light which has been passed through the optical rotation means to irradiate those rays of light onto the optical disc, and to allow rays of a reflected light produced as the result of the fact that those rays of reflected light are irradiated onto the optical disc to be transmitted therethrough; and a light of a polarization beam splitter interposed between the diffraction means and the optical rotation means and adapted to allow a light of a predetermined polarization component of laser beams incident thereto to be passed therethrough and to allow a polarization component perpendicular to the predetermined polarization component to be reflected to thereby emit the incident light and the reflected light in different directions. Further, the optical pick-up device comprises: a beam splitter interposed between the diffraction means and the polarization beam splitter and adapted to allow a predetermined quantity of laser beams of laser beams incident thereto to be reflected and to allow a predetermined quantity thereof to be transmitted therethrough; first detecting means adapted to receive the reflected light separated from the incident light by the polarization beam splitter to detect at least a magneto-optical signal in dependency upon the light receiving result; and second detecting means adapted to receive the reflected light reflected by the beam splitter to detect at least a tracking error signal in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned first detecting means detects at least a magneto-optical signal by light receiving means consisting of two light receiving areas for receiving the 0-th order light.

Moreover, the second light receiving means detects at least a tracking error signal by first light receiving means consisting of four light receiving areas for receiving the 0-th order light, second light receiving means consisting of two light receiving areas for receiving the +1-th order light, and third light receiving means consisting of two light receiving areas for receiving the −1-th order light.

Thus, it is possible to cope with, by so called three beam method, all (various) optical discs such as magneto-optical disc, write once disc, compact disc, and video disc, etc.

Moreover, since only one polarization beam splitter is used, reduction of the optical path can be realized, and the optical pick-up device itself can become compact. In addition, simplification of the configuration and low cost of the optical pick-up device can be realized through reduction of the number of parts.

The optical pick-up device according to this invention comprises: a laser light source for emitting laser beams as an incident light; diffraction means for separating the incident is light into a 0-th order light, a +1-th order light and −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical pick-up device further includes a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough. Further, the optical pick-up device includes an optical block having a polarization beam splitter film interposed between the diffraction means and the optical rotation means and adapted to allow a light of a predetermined polarization component of laser beams incident thereto to be passed therethrough and to allow a light of a polarization component perpendicular to the predetermined polarization component to be reflected to thereby emit the incident light and the reflected light in different directions, and a beam splitter film interposed in parallel to the polarization beam splitter film between the polarization beam splitter film and the diffraction means and adapted to allow a predetermined quantity of laser beams incident thereto to be reflected and to allow a predetermined quantity thereof to be passed therethrough. Further, the optical pick-up device includes first detecting means adapted to receive a reflected light separated from the incident light by the polarization beam splitter film of the optical block to detect at least a magneto-optical signal and a tracking error signal by the three spot method in dependency upon the light receiving result, and second detecting means adapted to receive the reflected light reflected by the beam splitter film of the optical block to detect at least a tracking error signal by the push-pull method in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned first detecting means detects a magneto-optical signal and a tracking error signal by the three spot method by first light receiving means consisting of eight light receiving areas for receiving the 0-th order light, second light receiving means consisting of two light receiving areas for receiving the +1-th order light, and third light receiving means consisting of two light receiving areas for receiving the −1-th order light.

Moreover, the second detecting means detects a tracking error signal by the push-pull method by first light receiving means consisting of at least four light receiving areas for receiving the 0-th order light, and second light receiving means consisting of two light receiving areas for receiving the +1-th order light, and third light receiving means consisting of two light receiving areas for receiving the −1-th order light.

Thus, it is possible to cope with, by so called three beam method or push-pull method, all (various) optical discs such as magneto-optical disc, write once disc, compact disc, and video disc, etc.

Moreover, since only one polarization beam splitter is used, reduction of the optical path can be realized, and the optical pick-up device itself can become compact. In addition, simplification of the configuration and low cost of the optical pick-up device can be realized through reduction of the number of parts.

The optical pick-up device according to this invention comprises: a laser light source for emitting laser beams as an incident light; diffraction means for separating the incident light into a 0-th order light, a +1-th order light and a −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical pick-up device includes a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough, and hologram means interposed between the diffraction means and the optical rotation means and adapted to emit the incident light without changing the optical path and to emit the reflected light in the state where the optical path is changed by a predetermined quantity. Further, the optical pick-up device comprises: a polarization beam splitter interposed between the hologram means and the diffraction means and adapted to allow a light of a predetermined polarization component of laser beams incident thereto to be passed therethrough and to allow a light of a polarization component perpendicular to the predetermined polarization component to be reflected to thereby emit the incident light and the reflected light in different directions, first detecting means adapted to receive a reflected light reflected by the polarization beam splitter to detect at least a magneto-optical signal in dependency upon the light receiving result, and second detecting means adapted to receive a reflected light which has been caused to undergo change of the optical path by the hologram means and has been transmitted through the polarization beam splitter to detect at least a tracking error signal in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned detecting means detects at least a magneto-optical signal by at least four light receiving areas for receiving the 0-th order light.

Moreover, the second detecting means detects at least a tracking error signal by first light receiving means consisting of at least three light receiving areas for receiving the 0-th order light, and second light receiving means for receiving the +1-th order light, and third light receiving means for receiving the −1-th order light.

Thus, it is possible to cope with, by so called three beam method, all (various) optical discs such as magneto-optical disc, write once disc, compact disc, and video disc, etc.

Moreover, since only one polarization beam splitter is used, reduction of the optical path can be realized, and the optical pick-up device itself can be compact. In addition, simplification of the configuration and low cost of the optical pick-up device can be realized through reduction of the number of parts.

The optical pick-up device according to this invention comprises: a laser light source for emitting laser beams as an incident light, diffraction means for separating the incident light into a 0-th order light, a +1-th order light and a −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical pick-up device includes a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough; hologram means interposed between the diffraction means and the optical rotation means and adapted to emit the incident light without changing the optical path and to emit the reflected light in the state where the optical path is changed by a predetermined quantity; and a beam splitter interposed between the hologram means and the diffraction means and adapted to allow a predetermined quantity of laser beams to be reflected and to allow a predetermined quantity of laser beams to be passed therethrough. Further, the optical pick-up device includes first detecting means adapted to receive a reflected light reflected by the beam splitter to detect at least a tracking error signal in dependency upon the light receiving result, and second detecting means adapted to receive a reflected light which has been caused to undergo change of the optical path by the hologram means and has been transmitted through the beam splitter to detect at least a magneto-optical signal in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned first detecting means detects at least a tracking error signal by first light receiving means consisting of at least four light receiving areas for receiving the 0-th order light, second light receiving means consisting of at least two light receiving areas for receiving the +1-th order light, and third light receiving means consisting of at least two light receiving areas for receiving the −1-th order light.

In addition, the second detecting means consists of at least two light receiving areas for receiving the 0-th order light, and detects at least a magneto-optical signal in dependency upon the light receiving result.

Thus, it is possible to cope with, by so called three beam method, all (various) optical discs such as magneto-optical disc, write once disc, compact disc, and video disk, etc.

Moreover, since only one polarization beam splitter is used, reduction of the optical path can be realized, and the optical pick-up device itself can become compact. In addition, simplification of the configuration and low cost of the optical pick-up device can be realized through reduction of the number of parts.

The optical pick-up device according to this invention includes a laser light source for emitting laser beams as an incident light; diffraction means for separating the incident light into a 0-th order light, a +1-th order light and a −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical pick-up device includes a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough; hologram means interposed between the diffraction means and the optical rotation means and adapted to emit the incident light without changing the optical path and to emit the reflected light in the state where the optical path is changed by a predetermined quantity, and detecting means adapted to receive a reflected light which has been caused to undergo change of the optical path by the hologram means to detect at least a magneto-optical signal and a tracking error signal in dependency upon the light receiving result.

In more practical sense, the above-mentioned optical rotation means is divided by a boundary line in correspondence with the track direction of the optical disc, or is divided by a boundary line in correspondence with the radial direction of the optical disc.

Further, the above-mentioned detecting means detects at least a magneto-optical signal and a tracking error signal by first light receiving means consisting of at least three light receiving areas for receiving the 0-th order light, second light receiving means for receiving the +1-th order light, and third light receiving means for receiving the −1-th order light.

Thus, it is possible to cope with, by so called three beam method, all (various) optical discs such as magneto-optical disc, write once disc, compact disc, and video disc, etc.

Moreover, not only the polarization beam splitter but also the beam splitter can be completely omitted, the optical path can be reduced to much degree, and the optical pick-up device itself can become compact. In addition, simplification of the configuration and low cost of the optical pick-up device can be realized through reduction of the number of parts.

Alternatively, in the optical pick-up device according to this invention, the above-mentioned hologram means, optical rotation means and lens member are constituted in one body as a movable unit driven by at least tracking error signal detected by the detecting means, and the laser light source and the light receiving means are constituted in one body as a laser module.

Also in this case, the above-mentioned optical rotation means is divided by a boundary line in correspondence with the track direction of the optical disc, or is divided by a boundary line in correspondence with the radial direction of the optical disc.

Further, the above-mentioned detecting means detects at least a magneto-optical signal and a tracking error signal by first light receiving means consisting of at least three light receiving areas for receiving the 0-th order light, second light receiving means for receiving the +1-th order light, and third light receiving means for receiving the −1-th order light.

Thus, it is possible cope with, by so called three beam method, all (various) optical discs such as magneto-optical disc, write once disc, compact disc, and video disc, etc.

Moreover, not only polarization beam splitter but also beam splitter can be completely omitted, the optical path can be shortened to much degree, and the optical pick-up device itself can become compact. In addition, simplification of the configuration and low cost of the optical pick-up device can be realized through reduction of the number of parts.

The optical pick-up device according to this invention comprises: a laser light source for emitting laser beams as an incident light; diffraction means for separating the incident light into a 0-th order light, a +1-th order light and a −1-th order light spaced by predetermined distances in a radial direction of an optical disc; and optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light. Moreover, the optical-pick up device comprises: a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough; and an optical block including a polarizing beam splitter film interposed between the diffraction means and the optical rotation means and adapted to allow an incident light incident through the diffraction means to be reflected, and a total reflection film provided substantially in parallel to the polarization beam splitter film and adapted to allow a reflected light incident through the optical rotation means and the polarization beam splitter film to be totally reflected. Further, the optical pick-up device comprises a micro prism including an incident and reflection plane surface adapted to allow the incident light from the laser light source and the reflected light incident through the diffraction means to be respectively reflected by predetermined quantities and allow them to be transmitted therethrough by predetermined quantities, and an incident plane surface to which a reflected light reflected on the total reflection surface is incident. In addition, the optical pick-up device includes first detecting means adapted to receive a reflected light incident from the incident and reflection plane surface of the micro prism to detect at least a tracking error signal in dependency upon the light receiving result, and second detecting means adapted to receive a reflected light incident from the incident plane of the micro prism to detect at least a magneto-optical signal in dependency upon the light receiving result.

In more practical sense, the optical rotation means is divided by a boundary line in correspondence with the track direction of the optical disc, or is divided by a boundary line in correspondence with the radial direction of the optical disc.

Moreover, the micro prism includes half reflection means adapted to allow a reflected light incident into the micro prism through the incident and reflection plane surface to be transmitted therethrough by a predetermined quantity and to allow it to be reflected by a predetermined quantity, and total reflection means for totally reflecting a reflected light reflected by the half reflection means.

Further, the first detecting means detects at least a tracking error signal by first light receiving means consisting of at least six light receiving areas, which receives the 0-th order light of rays of a reflected light transmitted through the half reflection means, second light receiving means consisting of at least two light receiving areas, which is adapted to receive the +1-th order light, third light receiving means consisting of at least two light receiving areas, which is adapted to receive the −1-th order light, fourth light receiving means consisting of at least six light receiving areas, which is adapted to receive the 0-th order light of rays of a reflected light totally reflected by the total reflection means, fifth light receiving means consisting of at least two light receiving areas, which is adapted to receive the +1-th order light, and sixth light receiving means consisting of at least two light receiving areas, which is adapted to receive the −1-th order light.

Moreover, the second detecting means detects the magneto-optical signal by at least two light receiving areas for receiving the 0-th order light of rays of a reflected light incident from the incident plane of the micro prism.

Thus, it is possible to cope with, by so called three beam method, all (various) optical discs such as magneto-optical disc, write once disc, compact disc, and video disc, etc.

Further, the polarization beam splitter film is permitted to be of a single film structure, and the optical pick-up device itself can become compact through reduction of the optical path. In addition, simplification of the configuration and low cost of the optical pick-up device can be realized through reduction of the number of parts.

BEST MODE FOR CARRYING OUT THE INVENTION

Preferred embodiments of an optical pick-up device according to this invention will now be described with reference to the attached drawings.

Figure 1:
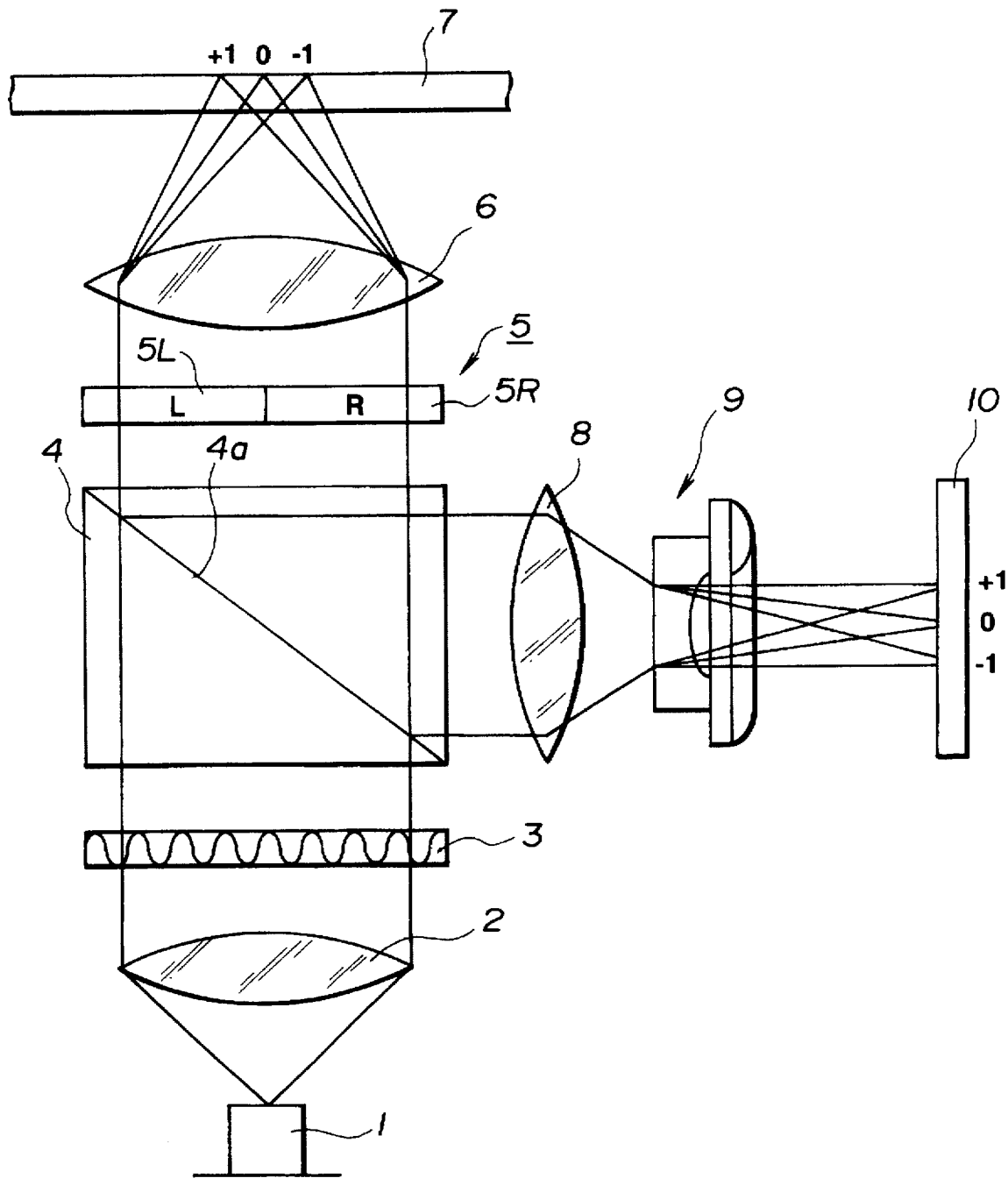
FIG. 1 is a view showing the configuration of an optical pick-up device according to a first embodiment of this invention.

Initially, the optical pick-up device according to the first embodiment of this invention comprises, as shown in FIG. 1, a laser light source 1, a collimator lens 2, a diffraction grating 3, a polarization (polarizing) beam splitter 4, a bisected optical rotation plate 5, and an object lens (objective) 6 which are provided in order with the optical axis of laser beams emitted from the laser light source 1 (hereinafter a light from the laser light source toward the optical disc will be referred to as an incident light) being as center.

Figure 2:
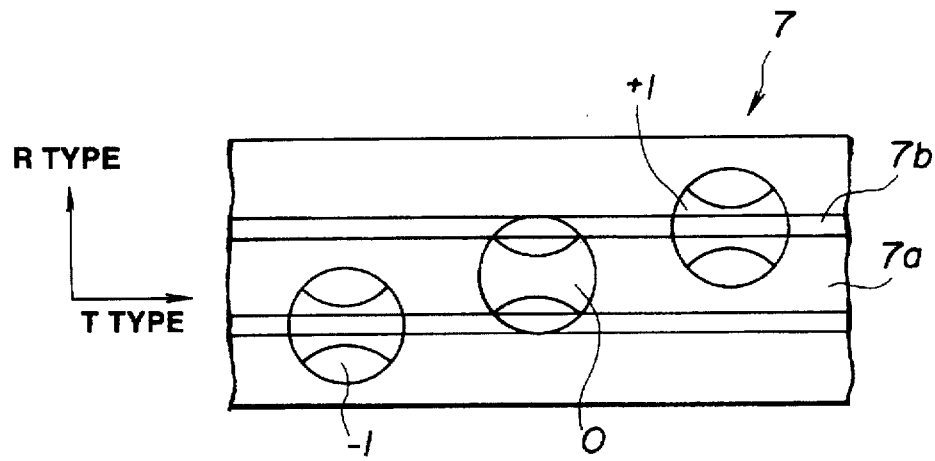
FIG. 2 is a view for explaining positions on the optical disc to which laser beams trisected by a diffraction grating provided in the optical pick-up device according to the first embodiment are respectively irradiated.

The diffraction grating 3 is of a structure in which their gratings are formed in the state inclined by a predetermined angle with respect to the radial direction of the optical disc 7, and has the characteristic that it divides (trisects), as shown in FIG. 2, an incident light incident through the collimator lens 2 into a 0-th order light for irradiating it onto recording track 7a of the optical disc 7, a +1-th order light for irradiating it in the state subjected to displacement to the inner circumferential side of the disc from the center of recording track 7a, and a −1-th order light for irradiating it in the state subjected to displacement to the outer circumferential side of the disc from the center of recording track 7a to emit them.

The bisected optical rotation plate 5 is divided (bisected) into, e.g., a right optical rotation plate 5R for optically rotating, by 22.5 degrees in a clockwise direction, e.g., in a right direction when viewed from the polarization beam splitter 4 side, the incident light and a reflected light produced as the result of the fact that the incident light is irradiated onto the optical disc 7 with the optical axis of the incident light being as a boundary, and a left optical rotation plate 5L for rotating, by 22.5 degrees in a counterclockwise direction, the incident light and a reflected light in a manner similar to the above.

This bisected optical rotation plate 5 is bisected by the boundary line so that in the case where an incident light of the 0-th order light is irradiated in the state of just track, with the recording track 7a being as the boundary, the incident light of the 0-th order light through the left optical rotation plate 5L is irradiated to the inner circumferential side of the disc, and the incident light of the 0-th order light through right optical rotation plate 5R is irradiated to the outer circumferential side of the disc (hereinafter an optical pick-up device having such a bisected optical rotation plate divided by the boundary line will be called T type).

A polarization beam splitter film 4a of the polarization beam splitter 4 has the characteristic that it allows a light of P polarization component to be transmitted therethrough and allows a light of S polarization component having polarization direction perpendicular to the P polarization component.

Moreover, the optical pick-up device includes an object lens (objective) 8 for converging rays of a reflected light reflected by the polarization beam splitter film 4a of the polarization beam splitter 4, a multi-lens 9 consisting of concave lens and cylindrical lens, and a photodetector 10 adapted to receive respective rays of reflected light of incident light of the 0-th order light and incident light of +1-th order light from the multi-lens 9 to output light quantity detection signals corresponding to the received light quantities.

The operation of the optical pick-up device according to the first embodiment will now be described.

Figure 3A:
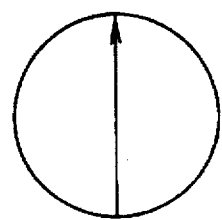
FIGS. 3(a)–3(g) are views for explaining the state where optical rotation angles of laser beams and reflected light are caused to be changeable (changed) by bisected optical rotation plate provided in the optical pick-up device according to the first embodiment.

Initially, at the time of reproduction or at the time of recording, e.g., an incident light having P polarization component as shown in FIG. 3(a) is emitted from the laser light source 1. This incident light is changed into a parallel light by the collimator lens 2, and is incident to the diffraction grating 3.

The diffraction grating 3 trisects (divides) the incident light into rays of incident light of the 0-th order light and rays of incident light of the ±1-th order light to emit them. These respective rays of incident light are incident to the polarization beam splitter 4.

As described above, the polarization beam splitter film 4a of the polarization beam splitter 4 has the characteristic that it allows light of P polarization component to be transmitted therethrough and allows light of S polarization component to be reflected. For this reason, rays of incident light incident to the polarization beam splitter 4 are transmitted through the polarization beam splitter film 4a and are incident to the bisected optical rotation plate 5.

Figure 3B:
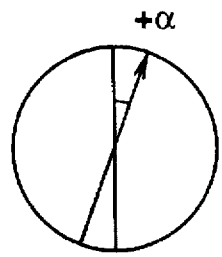
Figure 3C:
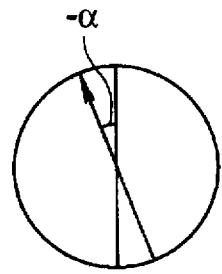

An incident light incident to the right optical rotation plate 5R of the bisected optical rotation plate 5 is optically rotated by 22.5 degrees in a clockwise direction as shown in FIG. 3(b), and is emitted therefrom. In addition, an incident light incident to the left optical rotation plate 5L is optically rotated by 22.5 degrees in a counterclockwise direction as shown in FIG. 3(c), and is emitted therefrom.

These respective rays of incident light are converged by the object lens 6 and are irradiated onto the optical disc 7.

When the respective rays of incident light are irradiated onto the optical disc 7 as stated above, respective rays of reflected light corresponding to the respective rays of incident light are produced. These respective rays of reflected light are incident to the bisected optical rotation plate 5 through the object lens 6.

In this case, when the incident light is reflected on the optical disc 7, going path and returning path are inverted. For this reason, an incident light caused to be through the right optical rotation plate 5R at the stage of the incident light is incident to the left optical rotation plate 5L at the stage of reflected light, and an incident light caused to be through the left optical rotation plate 5L at the stage of the incident light is incident to the right optical rotation plate at the stage of reflected light.

Figure 3D:
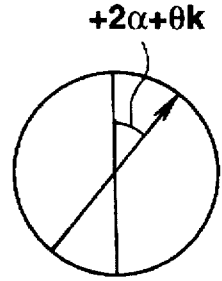
Figure 3E:
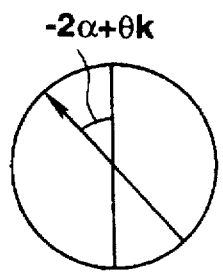

Since traveling directions of the incident light and the reflected light are opposite to each other, the reflected light incident to the left optical rotation plate 5L is further optically rotated by 22.5 degrees in a clockwise direction as shown in FIG. 3(d), and is emitted therefrom. Accordingly, respective rays of reflected light emitted from the left optical rotation plate 5L are emitted at an optical rotation angle of +45 degrees. In addition, a reflected light incident to the right optical rotation plate 5R is further optically rotated by 22.5 degrees in counterclockwise direction as shown in FIG. 3(e), and is emitted therefrom. Accordingly, respective rays of reflected light emitted from the right optical rotation plate 5R are emitted at an optical rotation angle of −45 degrees.

It is to be noted that in the case where a magneto-optical disc is provided as the optical disc 7, an optical rotation angle of θk is added by so called Kerr effect in dependency upon magnetization direction of magneto-optical film (MO film) in reflection of the incident light. For this reason, in the case where such a magneto-optical disc is provided as the optical disc 7, optical rotation angles of respective rays of reflected light emitted from the respective optical rotation plates 5R, 5L respectively become optical rotation angles of +45 degrees+θk and −45 degrees+θk. Such rays of reflected light are emitted.

The respective rays of reflected light are optically rotated in this way so that they have both components of P polarization component and S polarization component. Respective rays of reflected light caused to be through the bisected optical rotation plate 5 are incident to the polarization beam splitter 4.

As described above, the polarization beam splitter film 4a of the polarization beam splitter 4 is adapted to allow light of S polarization component to be reflected and to allow light of P polarization component to be transmitted therethrough. In addition, respective rays of incident light incident to the polarization beam splitter 4 respectively have both polarization components of P polarization component and S polarization component.

For this reason, substantially one half of respective rays of reflected light incident to the polarization beam splitter 4 are reflected by the polarization beam splitter film 4a as the S polarization component, and the remaining half are transmitted through the polarization beam splitter film 4a as the P polarization component.

Figure 3F:
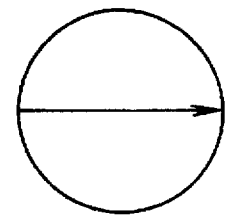
Figure 3G:
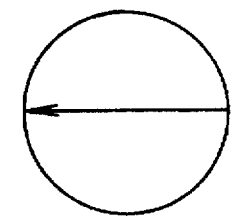

It is to be noted that while respective rays of reflected light reflected by the polarization beam splitter 4 is light of S polarization component, the right side indicates S polarization component in right optical rotation direction as shown in FIG. 3(f) with the optical axis being as the boundary and the left side indicates S polarization component in left optical rotation direction as shown in FIG. 3(g) with the optical axis being as the boundary. Such respective rays of reflected light of S polarization component are irradiated onto the photodetector 10 through the object lens 8 and the multi-lens 9.

Figure 4:
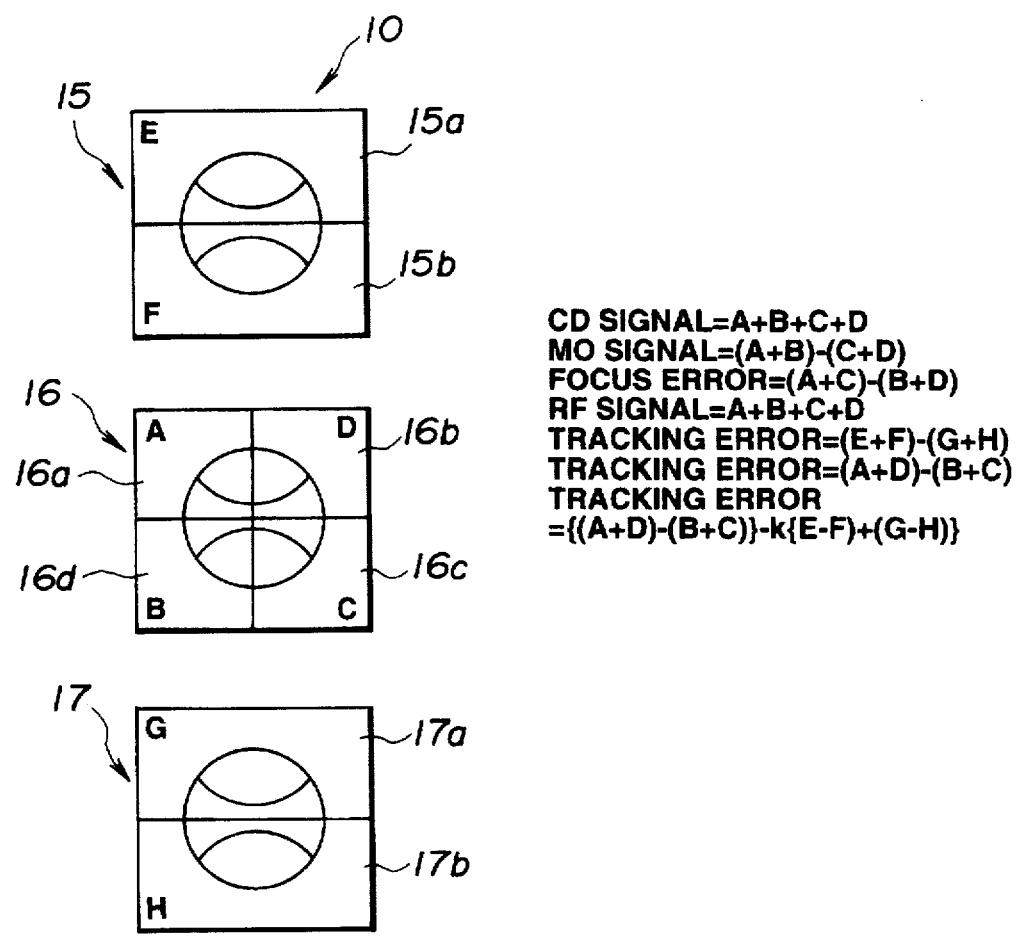
FIG. 4 is a view for explaining the configuration of a photodetector provided in the optical pick-up device according to the first embodiment.

The photodetector 10 is composed, as shown in FIG. 4, of a first photodetector 15 for receiving a reflected light of an incident light of the +1-th order light of the respective rays of reflected light, a second photodetector 16 for receiving a reflected light of an incident light of the 0-th order light, and a third photodetector 17 for receiving a reflected light of an incident light of the −1-th order light.

The first photodetector 15 is composed of a first light receiving section 15a and a second light receiving section 15b bisected (divided) in correspondence with the track direction of the disc so as to uniformly receive rays of reflected light of an incident light of the +1-th order light.

The second photodetector 16 is composed of first to fourth light receiving sections 16a~16d divided into four portions with the optical axis of the reflected light of the 0-th order light being as center by the boundary lines in a radial direction of the optical disc 7 and a direction perpendicular thereto.

The third photodetector 17 is composed of a first light receiving section 17a and a second light receiving section 17b bisected (divided) in correspondence with the track direction of the disc so as to uniformly receive rays of reflected light of incident light of −1-th order light.

These respective photodetectors 15~17 respectively form light quantity detection signals in dependency upon received light quantities to deliver them to a signal processing system.

The signal processing system carries out detection of respective signals indicated below when it is assumed that respective light quantity detection signals detected at respective light receiving sections 16a~16d of the second photodetector 16 are respectively designated at A~D, light quantity detection signals detected at respective light receiving sections 15a, 15b of the first photodetector 15 are respectively designated at E, F, and light quantity detection signals detected at respective light receiving sections 17a, 17b of the third photodetector 17 are designated at G, H.

Initially, in the case where an optical disc (e.g., reproduction only optical disc, etc.) except for a magneto-optical disc such as a compact disc, etc. where grooves 7b are formed along the recording tracks 7a is loaded as the optical disc 7, calculations expressed below are performed:

$$RF\ signal = A+B+C+D$$

$$Focus\ error\ signal = (A+C)-(B+D)$$

$$Tracking\ error\ signal = (E+F)-(G+H),$$

thus to carry out detection of recording data recorded on the reproduction only optical disc, etc., focus error signal and tracking error signal.

In this example, the focus error is detected by so called astigmatism method and the tracking error is detected by the push-pull method.

Moreover, in the case where a magneto-optical (MO) disc where grooves 7b are formed along the recording tracks 7a is loaded as the optical disc 7, the signal processing system performs calculations expressed below:

$$MO\ signal = (A+B)-(C+D)$$

$$Focus\ error\ signal = (A+C)-(B+D)$$

$$Push\text{-}Pull\ signal = (A+D)-(B+C)$$

to carry out detection of recording data recorded on the magneto-optical disc, RF signal, focus error signal, and a push-pull signal.

Further, in the case where a magneto optical (MO) disc where no groove 7B is formed and servo patterns are recorded at predetermined intervals is loaded as the optical disc 7, the signal processing system carries out calculations expressed below:

$$MO\ signal = (A+B)-(C+D)$$

$$RF\ signal = A+B+C+D$$

$$Focus\ error\ signal = (A+C)-(B+D)$$

$$Push\text{-}Pull\ signal = (A+D)-(B+C)$$

to carry out detection of recording data recorded on the magneto optical disc, RF signal, focus error signal and push-pull signal. In this case, the above-mentioned RF signal is used for extracting the servo pattern to form phase-controlled channel clock, etc. on the basis of reproduction timing of the servo pattern.

In this example, in detection of the push-pull signal, calculation expressed below is performed as a differential push-pull signal (DPP signal), $$DPP\ signal = [(A+D)-(B+C)]-K[(E-F)+(G-H)]$$

thereby making it possible to detect a push-pull signal in which the offset component is canceled. Thus, it is possible to detect more precise push-pull signal.

"K" in the above-mentioned calculation formula for DPP signal indicates a predetermined coefficient. The reason why such coefficient is employed is that since the level of a reflected light of the 0-th order light received at the second photodetector 16 is 80% of total reflection light quantity, whereas the level of a reflected light of the +1-th order light received at the first and third photodetectors 15, 17 is about 20% of the total reflection light quantity, the reflected light of the +1-th order light is multiplied by K to become in correspondence with the level of the reflected light of the 0-th order light.

In this case, the bisected optical rotation plate 5 may be of a structure bisected so that in the case where the incident light of the 0-th order light is irradiated in the just track state, an incident light of the 0-th order light caused to be through right optical rotation plate 5R is irradiated at the right side with the line perpendicular to the recording track 7a being as the boundary, and an incident light of the 0-th order light caused to be through left optical rotation plate 5L is irradiated at the left side with the line perpendicular to the recording track 7a being as the boundary (hereinafter an optical pick-up device having bisected optical rotation plate of such a structure will be called R type).

In this case, in the case where magneto-optical disc is provided as the optical disc 7, the signal processing system detects, on the basis of the following calculation formula, MO signal, focus error signal, RF signal, and push-pull signal.

$$MO\ signal = (A+B)-(B+C)$$

$$Focus\ error\ signal = (A+C)-(B+D)$$

$$RF\ signal = A+B+C+D$$

$$Push\text{-}Pull\ signal = (E+F)-(G+H)$$

As stated above, the optical pick-up device according to the first embodiment of this invention can detect recording data, RF signal and servo signal by so called three spot method using three rays of incident light, and can cope with optical disc of various structures such as magneto-optical disc, compact disc or video disc, etc.

In addition, since only one polarization beam splitter is used, it is possible to provide a compact and inexpensive optical pick-up device through reduction of the optical path of an incident light, etc. from reduction of the number of parts and simplification of the configuration.

An optical pick-up device according to a second embodiment of this invention will now be described. It is to be noted that the same reference numerals are respectively attached to portions which carry out the same operations as those of the above-described optical pick-up device of the first embodiment in the description of the second embodiment, and their detailed explanation is omitted.

Figure 5:
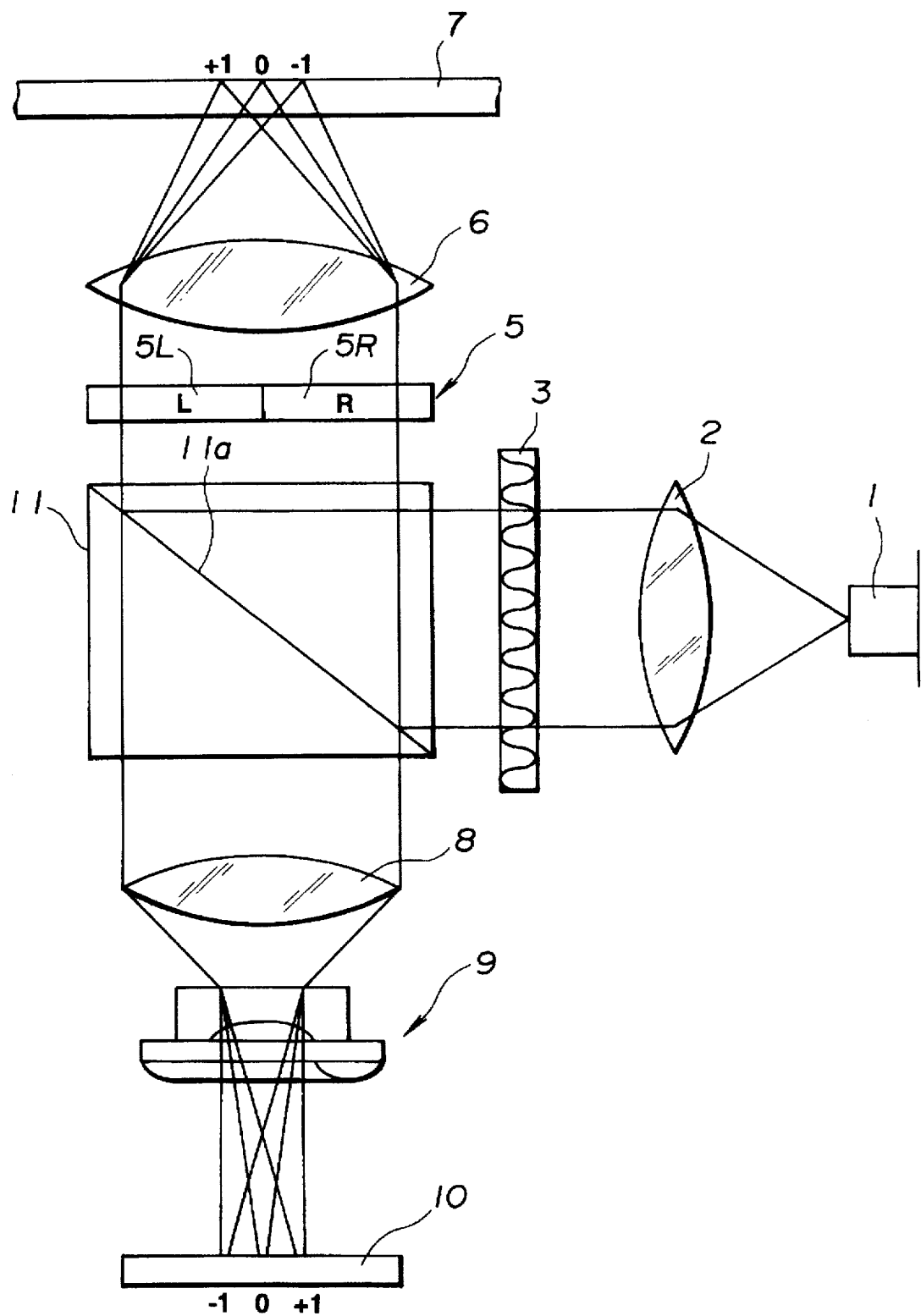
FIG. 5 is a view showing the configuration of an optical pick-up device according to a second embodiment of this invention.

The optical pick-up device according to the second embodiment is of a structure as shown in FIG. 5 in which a polarization beam splitter 11 provided with a polarization beam splitter film 11a having the characteristic that it allows a light of P polarization component to be reflected and allows a light of S polarization component to be transmitted therethrough is provided as the polarization beam splitter, and an incident light emitted from laser light source 1 is trisected (divided into three rays of light) by diffraction grating 3 to irradiate those rays of incident light onto the polarization beam splitter 11. Then, these respective rays of incident light are reflected by the polarization beam splitter film 11a of the polarization beam splitter 11 to irradiate rays of reflected light onto optical disc 7 to receive such reflected light by photodetector 10 through the polarization beam splitter 11.

Thus, it is possible to obtain the same effects or advantages as those of the above-described optical pick-up device according to the first embodiment.

An optical pick-up device according to a third embodiment of this invention will now be described.

Figure 6:
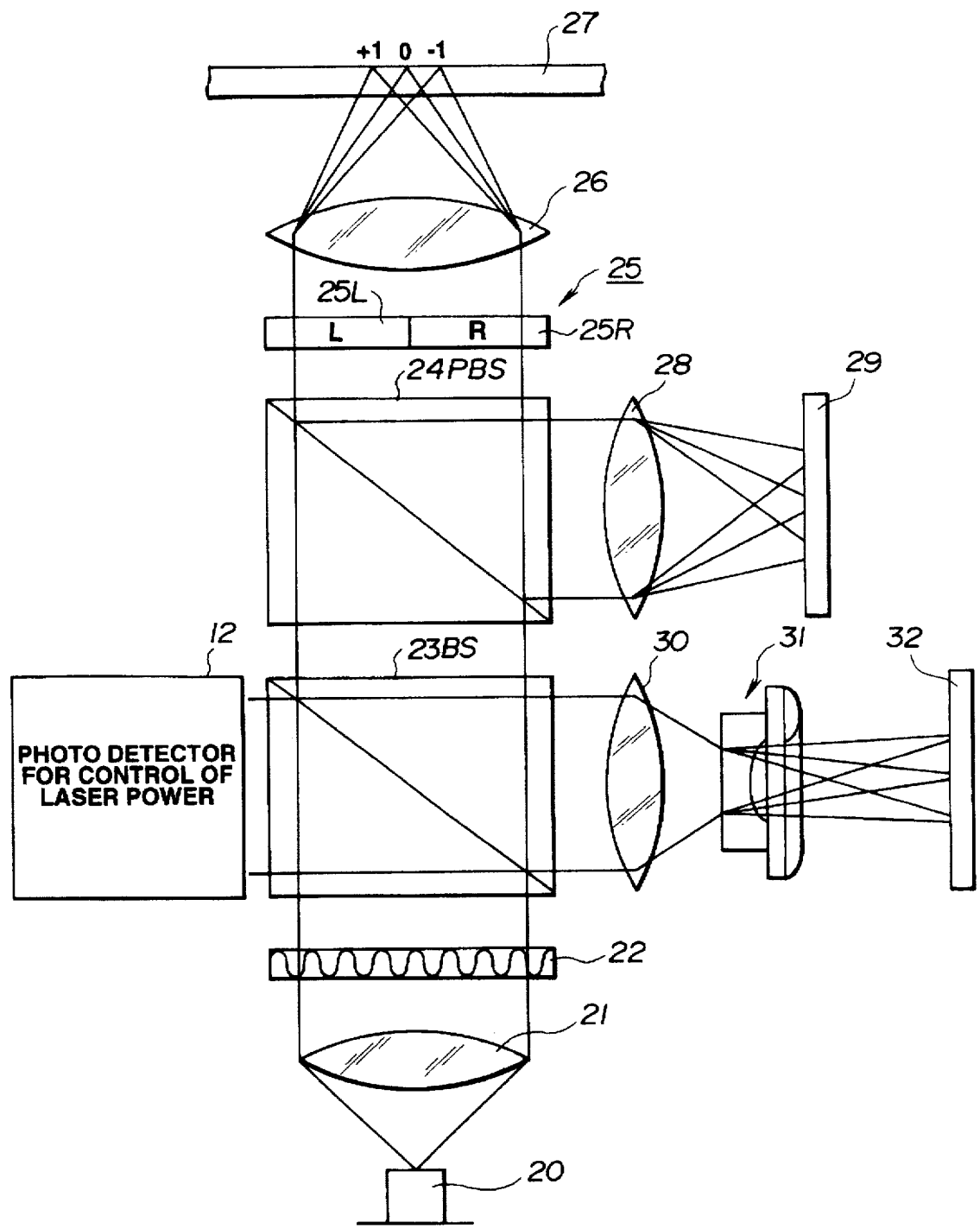
FIG. 6 is a view showing the configuration of an optical pick-up device according to a third embodiment of this invention.

The optical pick-up device according to the third embodiment is of a structure as shown in FIG. 6 in which a collimator lens 21, a diffraction grating 22, a beam splitter 23, a polarization beam splitter 24, a bisected optical rotation plate 25, and an object lens (objective) 26 are provided in order between a laser light source 20 and an optical disc 27 with the optical axis of an incident light emitted from the laser limit source 20 being as center.

The beam splitter 23 has the characteristic that, e.g., it allows substantially one half of an incident light to be transmitted therethrough and allows the remaining half to be reflected. For this reason, in this optical pick-up device, there are provided in order a photodetector 12 for control of laser power for the purpose of receiving an incident light reflected by the beam splitter film 23, and an object lens 30, a multi-lens 31 and a second photodetector 32 for the purpose of receiving a reflected light reflected by the beam splitter film 23.

The polarization beam splitter 24 has the characteristic that it allows a light of P polarization component to be transmitted therethrough and allows a light of S polarization component to be reflected. For this reason, in this optical pick-up device, an object lens 28 and a first photodetector 29 are provided in order with a view to receiving a reflected light reflected by the polarization beam splitter 24.

The diffraction grating 22 is adapted to trisect an incident light into rays of incident light of the 0-th order light and rays of incident light of the ±1-th order light similarly to the first embodiment.

The operation of the optical pick-up device according to the third embodiment will now be described.

In the optical pick-up device according to the third embodiment, an incident light emitted from the laser light source 20 is trisected into rays of incident light of the 0-th order light and rays of incident light of the ±1-th order light by the diffraction grating 22, and those rays of incident light are incident to the beam splitter 23. The beam splitter 23 serves to allow substantially one half of the total light quantity of the rays of incident light to be reflected to irradiate them onto the laser power control photodetector 12, and to allow the remaining half to be transmitted therethrough. Respective rays of incident light which have been transmitted through the beam splitter 23 are incident to the polarization beam splitter 24.

The laser power control photodetector 12 detects light quantity of the irradiated incident light to deliver this light quantity detection signal to a signal processing system. Thus, the signal processing system carries out, on the basis of the light quantity detection signal, a servo control so that laser power of an incident light emitted from the laser light source 20 is kept constant at all times.

The polarization beam splitter 24 has, as described above, the characteristic that it allows light of P polarization component to be transmitted therethrough and allows light of S polarization component to be reflected. For this reason, an incident light incident to the polarization beam splitter 24 is transmitted through the polarization beam splitter 24, and is then incident to the bisected optical rotation plate 25.

The bisected optical rotation plate 25 has the configuration of the T type similarly to the bisected optical rotation plate 5 of the above-described optical pick-up device according to the first embodiment, and serves to optically rotate, by means of right rotation section 25R and left optical rotation section 25L, respective rays of incident light incident thereto by 22.5 degrees in clockwise direction or in counterclockwise direction with the optical axis being as the boundary to emit them. The respective rays of incident light caused to be through the bisected optical rotation plate 25 are converged by the object lens 26, and are irradiated onto the optical disc 27.

When the respective rays of incident light are irradiated onto the optical disc 27 as described above, rays of reflected light of the respective rays of incident light are produced. These respective rays of reflected light are incident to the bisected optical rotation plate 25 through the object lens 26.

In this instance, a reflected light according to an incident light caused to be through the right optical rotation plate 25R at the stage of incident light is incident to the left optical rotation plate 25L, and a reflected light according to an incident light caused to be through the left optical rotation plate 25L at the stage of incident light is incident to the right optical rotation plate 25R. Thus, the respective rays of reflected light are caused to respectively have optical rotation angles of ±45 degrees at the right side and the left side with the optical axis being as the boundary, and are emitted in the state where they are allowed to have thus both components of the P polarization component and the S polarization component.

It is to be noted that in the case where magneto-optical disc was provided as the optical disc 27, an optical rotation angle of θK is added to optical rotation angles of respective rays of reflected light in dependency upon recording data as described above.

The rays of reflected light caused to be through the bisected optical rotation plate 25 are incident to the polarization beam splitter 24.

The polarization beam splitter 24 serves to allow respective rays of reflected light of S polarization component to be reflected and to allow respective rays of reflected light of P polarization component to be transmitted therethrough. For this reason, the respective rays of reflected light of S polarization component are irradiated onto the first photodetector 29 through the object lens 28, and the respective rays of reflected light of P polarization component are incident to the beam splitter 23.

The beam splitter 23 allows substantially one half of the respective rays of reflected light to be transmitted therethrough and allows the remaining half to be reflected to irradiate them onto a second photodetector 32 through an object lens 30 and a multi-lens 31.

Figure 7:
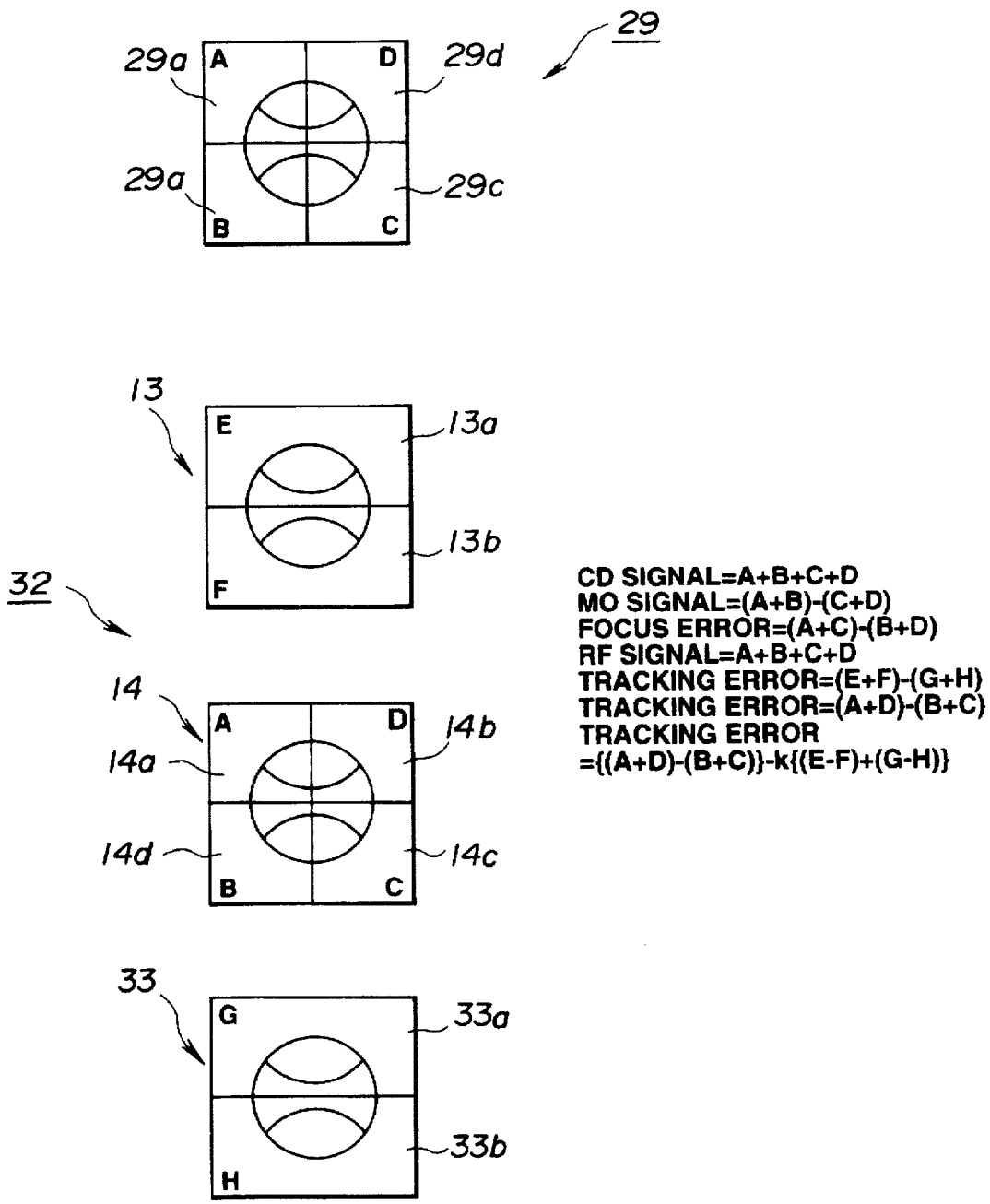
FIG. 7 is a view for explaining the configuration of a photodetector provided in the optical pick-up device according to the third embodiment.

The first photodetector 29 is a photodetector for detection of MO signal, and is adapted to receive only reflected light of an incident light of the 0-th order light which has been irradiated onto recording tracks of the optical disc 27 and has been reflected therefrom of the respective irradiated rays of reflected light. In this case, the light receiving area is divided into four sections with the optical axis of the reflected light being as center by the boundary line in a radial direction of the optical disc 27 and the boundary line in a direction perpendicular thereto as shown in FIG. 7. In the case where the optical disc 27 is magneto-optical disc, the first photodetector 29 forms light quantity detection signals corresponding to light received quantities respectively received at respective light receiving areas 29a~29d to deliver those signals to a signal processing system.

The signal processing system carries out detection of MD signal by the following calculation formula when light quantity detection signals from the light receiving areas 29a~29d are assumed to be A~D.

$$MO\ signal=(A+B)-(C+D)$$

Moreover, the second photodetector 32 is composed of a first bisected photodetector 13 of which light receiving area is divided into two sections, a four division photodetector 14, and a second bisected photodetector 33 as shown in FIG. 7 similarly to the above-described optical pick-up device according to the first embodiment. Further, the second photodetector 32 forms light quantity detection signals corresponding to light quantities of respective rays of reflected light received at light receiving areas 13a, 13b, 14a~14d, 33a, 33b to deliver these signals to the signal processing system.

In the case where a magneto-optical disc is provided as the optical disc 27, the signal processing system forms RF signal, focus error signal, push-pull signal, or differential push-pull signal by the following calculation formulas.

$$RF\ signal=A+B+C+D$$

$$Focus\ error\ signal=(A+C)-(B+D)$$

$$Push-Pull\ signal=(A+D)-(B+C)$$

$$DPP\ signal=[(A+D)-(B+C)]-K[(E-F)+(G-H)]$$

Moreover, in the case where optical disc except for magneto-optical disc (reproduction only optical disc where grooves are provided, such as, for example compact disc, etc.) is provided as the optical disc 27, the signal processing system forms RF signal, focus error signal and push-pull signal by the following calculation formulas:

$$RF\ signal=A+B+C+D$$

$$Focus\ error\ signal=(A+C)-(B+D)$$

$$Push-Pull\ signal=(E+F)-(G+H)$$

Thus, it is possible to form recording data and servo signal recorded on the optical disc 27.

Since the optical pick-up device according to the third embodiment extracts MO signal by an optical path different from that of servo information through the polarization beam splitter 24, it is possible to securely detect MO signal detected on the basis of very small change of optical rotation angle.

Moreover, since only one polarization beam splitter is used, it is possible to provide a compact and inexpensive optical pick-up device through reduction of the optical path of an incident light, etc. from reduction of the number of parts and simplification of the configuration, and to obtain the same effects or advantages of the above-described first embodiment.

It should be noted that while the optical pick-up device according to the third embodiment is of the T type, it may be of the R type.

In this case, while calculation formulas of detection of respective signal in the case where optical disc except for magneto-optical disc is loaded as the optical disc 27 are the same, in the case where magneto-optical disc is loaded as the optical disc 27, MO signal, focus error signal, RF signal and push-pull signal are detected by the following calculation formulas.

$$MO\ signal=(A+D)-(B+C)$$

$$Focus\ error\ signal=(A+C)-(B+D)$$

$$RF\ signal=A+B+C+D$$

$$Push-Pull\ signal=(E+F)-(G+H)$$

An optical pick-up device according to a fourth embodiment of this invention will now be described.

Figure 8:
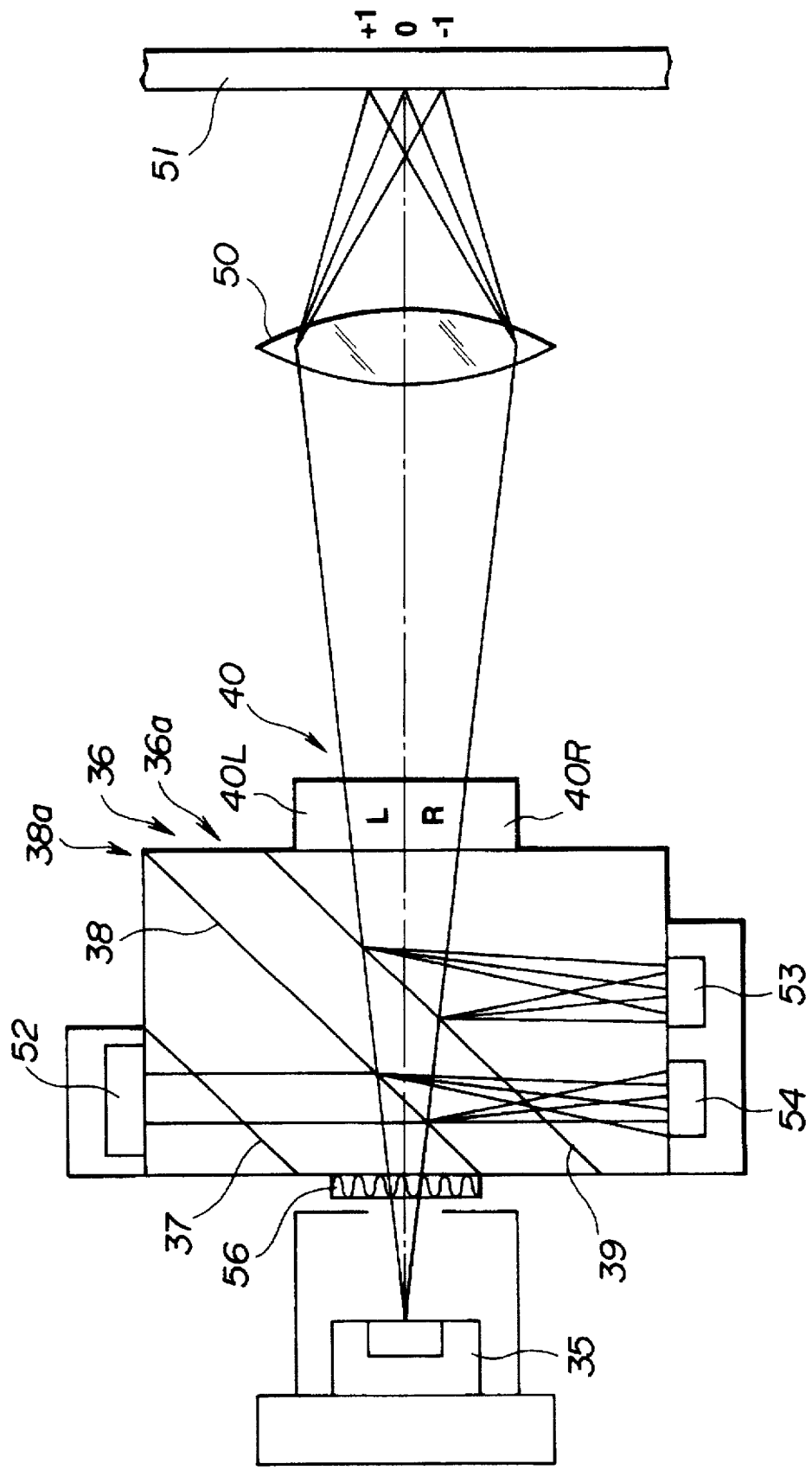
FIG. 8 is a view showing the configuration of an optical pick-up device according to a fourth embodiment of this invention.

The optical pick-up device of the fourth embodiment is of a structure as shown in FIG. 8 in which a diffraction grating 56, an optical block 36 and a bisected optical rotation plate 40 are provided in order between a laser light source 35 and an optical disc 51 with the optical axis of an incident light emitted from the laser light source 35 being as center.

The diffraction grating 56 is adapted to trisect (divide) an incident light into rays of an incident light of the 0-th order light and rays of an incident light of the ±1-th order light similarly to the above-mentioned first to third embodiments.

The optical block 36 is formed by providing, in parallel to each other so as to have an angle of 45 degrees with respect to an incident light incident thereto, a first polarization beam splitter film 37 adapted to allow light of P polarization component to be transmitted therethrough and to allow light of S polarization component to be reflected, a beam splitter film 38 adapted to allow an incident light to be transmitted therethrough by a predetermined quantity and to allow it to be reflected by a predetermined quantity, and a second polarization beam splitter film 39 adapted to allow light of P polarization component to be transmitted therethrough and to allow light of S polarization component to be reflected.

At the emitting plane surface of light which has been transmitted through the first polarizing beam splitter film 37 of the optical block 36, a photodetector 52 for control of light quantity is provided. At the emitting plane surface of light reflected by the second polarization beam splitter film 39, a first photodetector 53 is provided. At the emitting plane surface of light reflected by the beam splitter film 38, a second photodetector 54 is provided.

The operation of the optical pick-up device according to the fourth embodiment will now be described.

In the optical pick-up device according to the fourth embodiment, an incident light emitted from the laser light source 35 is incident to the diffraction grating 56. The diffraction grating 56 trisects (divides) the incident light into rays of an incident light of the 0-th order and rays of incident light of the ±1 order light to allow these rays of light to be incident to the beam splitter film 38 of the optical block 36.

The beam splitter film 38 serves to allow the respective rays of incident light by a predetermined quantity and to allow them to be transmitted therethrough by a predetermined quantity. Respective rays of incident light reflected by the beam splitter film 38 is incident to the first polarization beam splitter film 37, and respective rays of incident light which have been transmitted through the beam splitter film 38 are incident to the second polarization beam splitter film 39.

The first polarization beam splitter film 37 has the characteristic that it allows light of P polarization component to be transmitted therethrough. For this reason, the respective rays of incident light are transmitted through the first polarization beam splitter film 37, and are irradiated onto the photodetector 52 for control of light quantity.

While an incident light of S polarization component is occasionally emitted in addition to incident light of P polarization component from the laser light source 35, such incident light of S polarization component is reflected by the beam splitter 38 and the first polarization beam splitter 37, and is emitted to the external through emitting plane surface 38a of the optical block 36 as a stray light.

The light quantity control photodetector 52 receives an incident light of the 0-th order light for irradiation onto recording track of the optical disc 51 of the respective rays of incident light to deliver a light quantity detection signal corresponding to received light quantity to a laser driver for carrying out level control of an incident light emitted from the laser light source 35. The laser driver detects level of a current incident light on the basis of the light quantity detection signal to carry out light-emitting drive of the laser light source 35 so that the level of the incident light becomes constant. Thus, it is possible to emit an incident light of fixed level at all times.

Moreover, the second polarization beam splitter film 39 of the optical block 36 has the characteristic that it allows light of P polarization component to be transmitted therethrough and to allow light of S polarization component to be reflected as described above. For this reason, respective rays of incident light which have been transmitted through the beam splitter film 38 are also transmitted through the second polarization beam splitter film 39, and are incident to the bisected optical rotation plate 40.

The bisected optical rotation plate 40 has, e.g., the configuration of the T type similarly to the bisected optical rotation plate 5 of the above-described optical pick-up device according to the first embodiment, and serves to optically rotate, by right optical rotation plate 40L and left optical rotation plate 40L, respective rays of incident light incident thereto in clockwise direction or in counterclockwise direction with the optical axis being as the boundary to emit them. The respective rays of incident light caused to be through the bisected optical rotation plate 40 are converged by the object lens 50 and are irradiated onto the optical disc 51.

When the respective rays of incident light are irradiated onto the optical disc 51 as described above, respective rays of reflected light of incident light are produced. These respective rays of reflected light are incident to the bisected optical rotation plate 40 through the object lens 50. In this instance, similarly to the above-described optical pick-up device according to the first embodiment, rays of reflected light of incident light caused to be through right optical rotation plate 40R at the stage-of incident light of the rays of reflected light are incident to the left optical rotation plate 40L, and rays of reflected light of incident light caused to be through the left optical rotation plate 40L at the stage of incident light are incident to the right optical rotation plate 40R.

Thus, the respective rays of reflected light are optically rotated by ±45 degrees in clockwise direction or in counterclockwise direction with the optical axis being as the boundary so that they are caused to have both polarization components of P polarization component and S polarization component, and are then emitted.

It is to be noted that in the case where a magneto-optical disc is provided as the optical disc 7, an optical rotation angle of θk is added by so called Kerr effect in dependency upon magnetization direction of the magneto-optical film (MO film) in reflection of the incident light. For this reason, in the case where a magneto-optical disc is provided as the optical disc 51, respective rays of reflected light emitted from the respective optical rotation plates 40R, 40L are emitted under the state their optical rotation angles are respectively equal to optical rotation angles of +45 degrees+ θk and −45 degrees+θk.

Respective rays of reflected light which have been caused to be through the bisected optical rotation plate 40 are incident to the second polarization beam splitter film 39 of the optical block 36.

As described above, respective rays of reflected light caused to be through the bisected optical rotation plate 40 have both polarization components of P polarization component and S polarization component. For this reason, a reflected light of S polarization component of respective rays of reflected light incident to the second polarization beam splitter film 39 is reflected by the second polarization beam splitter film 39 and is irradiated onto the first photodetector 53. In addition, a reflected light of P polarization components of respective rays of reflected light incident to the second polarization beam splitter film 39 is transmitted through the second polarization beam splitter film 39 and is irradiated onto the beam splitter film 38.

The beam splitter film 38 allows a predetermined quantity of the respective rays of reflected light incident thereto to be reflected to irradiate the reflected light onto the second photodetector 54 through the second beam splitter film 39.

Figure 9:
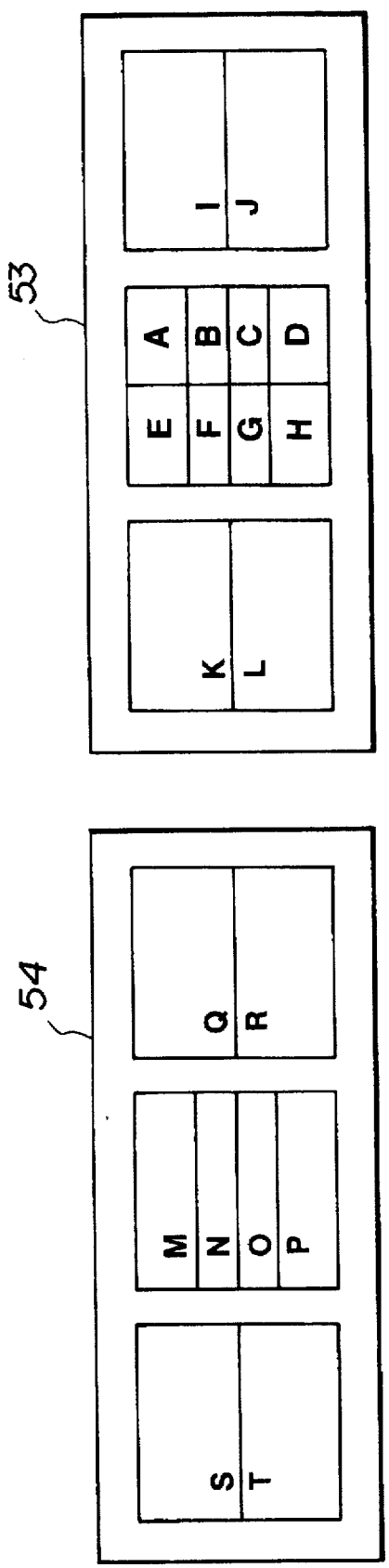
FIG. 9 is a view for explaining the configuration of a photodetector provided in the optical pick-up device according to the fourth embodiment.

The first photodetector 53 is composed, as shown in FIG. 9, of an eight division photodetector provided so as to receive a reflected light of the 0-th order light of S polarization component, and divided into eight sections so that received light quantities are respectively equal to each other; and first and second bisected photodetectors provided so as to respectively receive rays of reflected light of the ±1-th order light of polarization component, and respectively bisected so that received light quantities are equal to each other.

Moreover, the second photodetector 54 is composed of a four division photodetector provided so as to receive a reflected light of the 0-th order light of respective rays of reflected light of P polarization component reflected by the beam splitter 38 and transmitted through the second polarizing beam splitter 39, and divided into four sections so that received light quantities are respectively equal to each other and light receiving areas are provided in parallel; and first and second bisected photodetectors provided so as to receive rays of reflected light of the ±1-th order light of P polarization component and respectively bisected so that received light quantities are equal to each other.

Such respective photodetectors 53, 54 form light quantity detection signals in dependency upon light quantities of reflected light received in respective light receiving areas A~T to deliver those signals to the signal processing system.

In the case where a magneto-optical disc is provided as the optical disc 51, the signal processing system carries out calculations described below when light quantity detection signals from the respective light receiving areas A~T are assumed to be respectively designated at A~T to detect respective signals.

MO signal=$(A+B+C+D)-(E+F+G+H)$

Focus error signal=$(A+E+D+H+N+O)-(B+C+F+G+M+P)$

Push-Pull signal=$(A+B+E+F+O+P)-(C+D+G+H+M+N)$

DPP signal=$[(A+B+E+F+O+P)-(C+D+G+H+M+N)]-K[(I+J+Q+R+K+L+S+T)]$

RF signal=$M+N+O+P$

Moreover, in the case where an optical disc except for a magneto-optical disc, such as, for example, compact disc where grooves are provided along recording tracks is provided as the optical disc 51, the signal processing system carries out calculations described below with light quantity detection signals from the respective light receiving areas A~T being designated as A~T to detect respective signals.

RF signal=$M+N+O+P$

Focus error signal=$(A+E+D+H+N+O)-(B+C+F+G+M+P)$

Tracking error signal=$(I+J+Q+R)-(K+L+S+T)$

Since only one polarization beam splitter is used, the optical pick-up device according to the fourth embodiment can provide a compact and inexpensive optical pick-up device through reduction of the optical path of incident light, etc. from reduction of the number of parts and simplification of the configuration, and can provide the same effects or advantages of the above-described optical pick-up device according to the first embodiment.

It should be noted that it is a matter of course that even if the bisected optical rotation plate 40 is of the R type, the same effects or advantages as above can be obtained.

Figure 10:
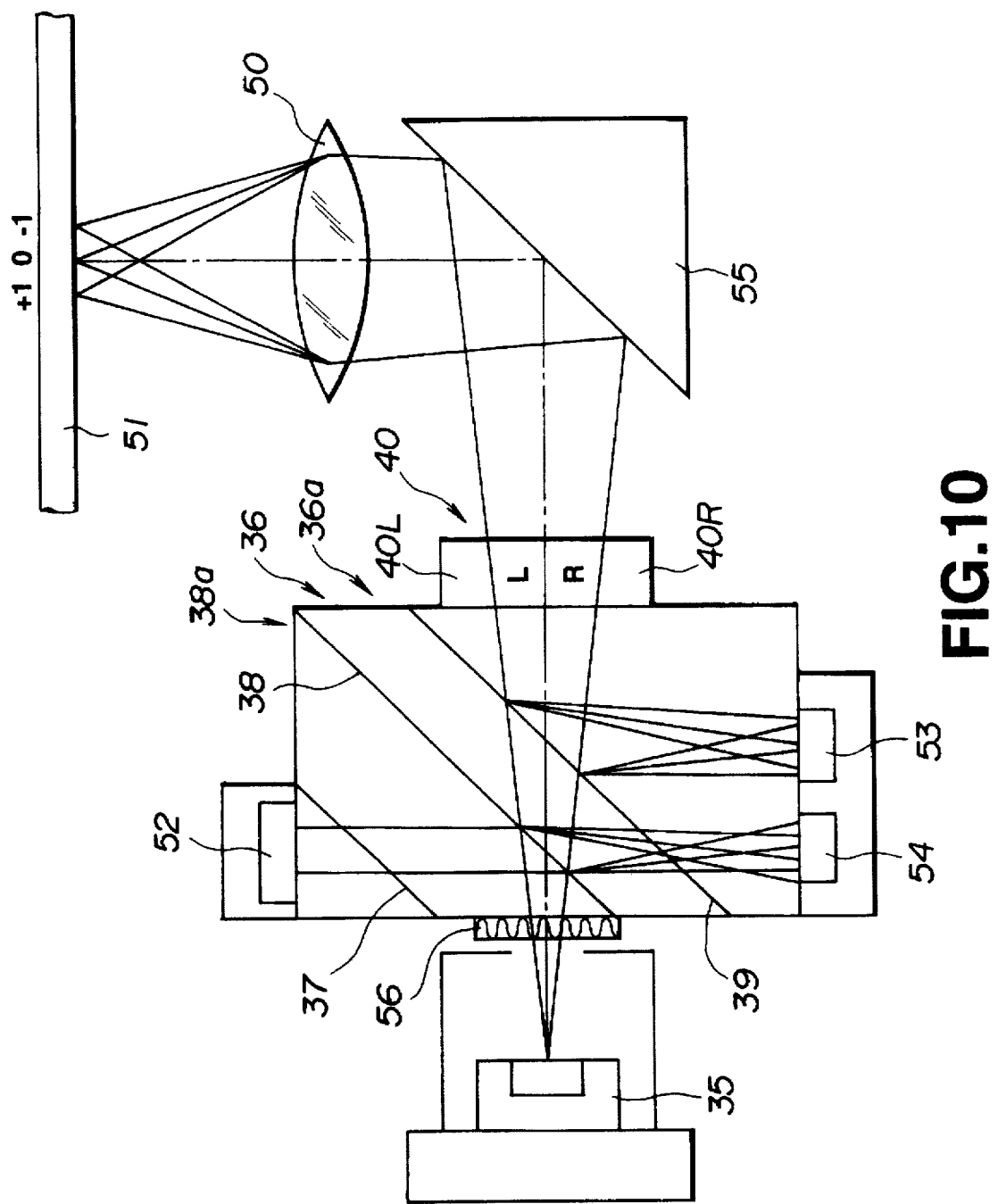
FIG. 10 is a view showing the configuration of an optical pick-up device according to a fifth embodiment of this invention.

An optical pick-up device according to a fifth embodiment of this invention will now be described. The optical pick-up device according to the fifth embodiment is a modification of the above-mentioned optical pick-up device according to the fourth embodiment, and is of a structure as shown in FIG. 10 to reflect respective rays of incident light from bisected optical rotation plate 40 by means of 45 degree mirror 55 to irradiate them onto optical disc 51 to allow respective rays of incident light to be incident, for a second time, to optical block 36 through the 45 degree mirror 55.

In this case, since the 45 degree mirror 55 is used, the optical path can be further reduced, and the same effects or advantages as those of the above-described fourth embodiment can be obtained.

An optical pick-up device according to a sixth embodiment will now be described.

Figure 11:
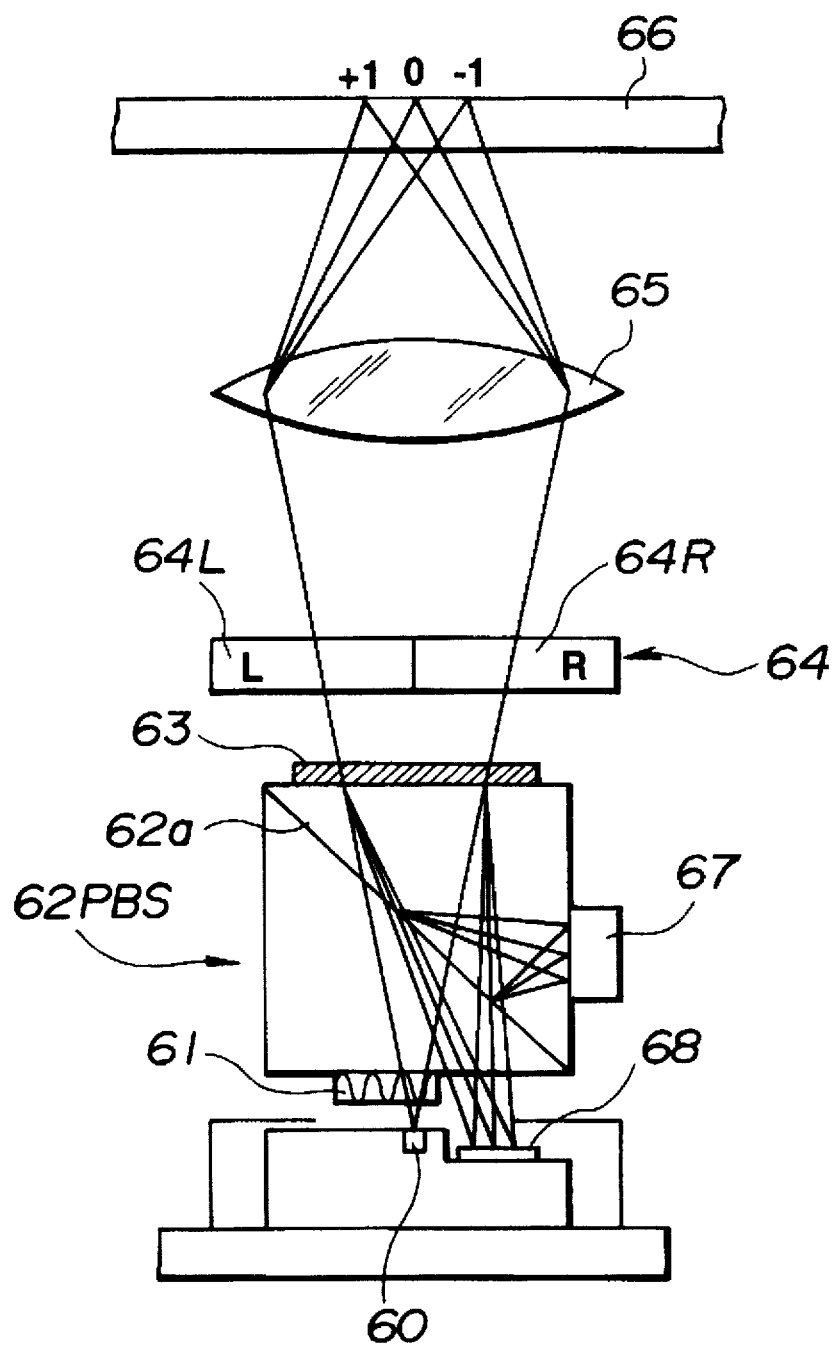
FIG. 11 is a view showing the configuration of an optical pick-up device according to a sixth embodiment of this invention.

The optical pick-up device according to the sixth embodiment is constituted, as shown in FIG. 11, by providing a diffraction grating 61, a polarization beam splitter 62, a hologram film 63, a bisected optical rotation plate 64 and an object lens 65 between a laser light source 60 and a magneto-optical disc 66 in order with the optical axis of an incident light emitted from the laser light source 60 being as center.

The above-mentioned polarization beam splitter 62 has the characteristic that, e.g., it allows light of P polarization component to be transmitted therethrough and allows light of S polarization component to be reflected.

Moreover, the hologram film 63 has the characteristic that the incident light is transmitted therethrough as it is without bending (changing) the optical path, and a reflected light produced as the result of the fact that the incident light is irradiated onto the optical disc 66 is emitted with the optical path being bent (changed) by a predetermined quantity.

Moreover, in the above-mentioned optical pick-up device, a first photodetector 67 is provided at the emitting (out going) plane of a reflected light reflected by the polarization beam splitter 62, and a second photodetector 66 is provided in the vicinity of the laser light source 60 so as to receive a reflected light which has been caused to undergo change of optical path by the hologram film 63 and has been transmitted through the polarizing beam splitter 62.

The operation of the optical pick-up device according to the sixth embodiment will now be described.

In the optical pick-up device according to the sixth embodiment, an incident light emitted from the laser light source 60 is incident to the diffraction grating 61. The diffraction grating 61 trisects (divides) the incident light into rays of reflected light of the 0-th order and rays of incident light of the ±1-th order light similarly to the above-described first embodiment. The respective rays of incident light are incident to the polarization beam splitter 62.

As described above, polarization beam splitter film 62a of the polarization beam splitter 62 has the characteristic that it allows light of P polarization component to be transmitted therethrough and allows light of S polarization component to be reflected. For this reason, the respective rays of incident light consisting of substantially only P polarization component are transmitted through the polarization beam splitter 62 and are incident to the hologram film 63.

The hologram film 63 is adapted so that when the respective rays of incident light are incident thereto, it emits them as they are without bending (changing) their optical paths. These respective rays of incident light are incident to the bisected optical rotation plate 64.

The bisected optical rotation plate 64 has, e.g., the configuration of the T type similarly to the bisected optical rotation plate 5 of the above-described optical pick-up device according to the first embodiment, and respectively optically rotates, by right optical rotation plate 64R and left optical rotation plate 64L, rays of incident light incident thereto by 22.5 degrees in clockwise direction or in counterclockwise direction with the optical axis being as the boundary. The respective rays of incident light caused to be through the bisected optical rotation plate 64 are converged by the object lens 65 and are irradiated onto the optical disc 66.

When the respective rays of incident light are irradiated onto the optical disc 66 as described above, rays of reflected light corresponding to respective rays of incident light are produced. These respective rays of reflected light are incident to the bisected optical rotation plate 64 through the object lens 65. In this instance, since optical path of incident light and that of reflected light are opposite to each other in traveling direction of light, a light caused to be through right optical rotation plate 64R at the stage of incident light is incident to left optical rotation plate 64L at the stage of reflected light, and a light caused to be through left optical rotation plate 64L at the stage of incident light is incident to right optical rotation plate 64R at the stage of reflected light.

Thus, the respective rays of reflected light are optically rotated further by 22.5 degrees in clockwise direction or in counterclockwise direction with the optical axis being as the boundary, and are emitted under the state where they are caused to have both components of P polarization component and S polarization component.

It is to be noted that in the case where a magneto-optical disc is provided as the optical disc 66, an optical angle of θk is added by so called Kerr effect.

Respective rays of reflected light caused to be through the bisected optical rotation plate 64 are incident to the hologram film 63. The hologram film 63 allows optical paths of the respective rays of reflected light to be varied by a predetermined quantity to emit them. The respective rays of reflected light of which optical paths have been varied are incident to the polarizing beam splitter 62.

As described above, respective rays of reflected light caused to be through the bisected optical rotation plate 64 have both components of P polarization component and S polarization component. For this reason, a reflected light of S polarization component of respective rays of reflected light incident to the polarization beam splitter 62 is reflected by the polarization beam splitter film 62a and is irradiated onto the first photodetector 67, and a reflected light of P polarization component is transmitted through the polarizing beam splitter film 62a, and is irradiated onto the second photodetector 68.

Figure 12:
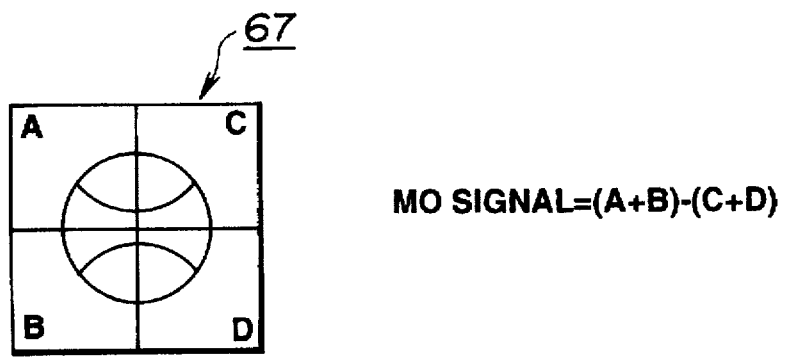
FIG. 12 is a view for explaining the configuration of a first photodetector provided in the optical pick-up device according to the sixth embodiment.

The first photodetector 67 is a photodetector for detection of MO signal, and serves to receive a reflected light of an incident light of the 0-th order light which is an incident light irradiated onto recording tracks of the rays of reflected light of the 0-th order light and reflected light of the ±1-th order light of the S polarization component. The light receiving area of the first photodetector 67 is divided into four sections by the boundary line in a radial direction of the optical disc 27 and the boundary line in a direction perpendicular thereto with the optical axis of the received reflected light of the 0-th order light being as center as shown in FIG. 12. Thus, the first photodetector 67 delivers, to the signal processing system, light quantity detection signals corresponding to light quantities of the reflected light received at the respective light receiving areas A~D.

Moreover, the second photodetector 68 is a photodetector for detection of servo signal, and is caused to serve as a five division photodetector having light receiving areas A~E as shown in FIG. 13(a). In such second photo detector 68, at the time of just focus (in focus state), rays of reflected light of dotted shape are irradiated into the respective light receiving areas A~E as shown in FIG. 13(a). However, in the case where focus deviates to the disc side, rays of reflected light of semicircular shape are irradiated into respective light receiving areas A~E as shown in FIG. 13(b). On the other hand, in the case where focus deviates to the side opposite to the disc, rays of reflected light of semicircular shape opposite to the case of FIG. 13(b) are irradiated into the respective light receiving areas A~E as shown in FIG. 13(c).

When the second photodetector 68 receives a reflected light in this way, it forms rays of light quantity detection signals corresponding to the received light quantities to deliver them to the signal processing system.

In the case where a magneto-optical disc is provided as the optical disc 66, the signal processing system detects a MO signal on the basis of a light quantity detection signal from the first photodetector 67 to form servo signals, RF signal on the basis of respective light quantity detection signals from the second photodetector 68.

MO signal=(A+B)−(C+D)

Focus error signal=A−B

Push-Pull signal=D−E

RF signal=A+B+C

Alternatively, in the case where an optical disc except for magneto-optical disc where grooves are provided along recording tracks, such as, for example, compact disc is provided as the optical disc 66, the signal processing system forms a RF signal and servo signals on the basis of a light quantity detection signal from the second photodetector 68.

RF signal=A+B+C

Focus error signal=A−B

Tracking error signal=D−E

It is to be noted that the above-mentioned bisected optical rotation plate 64 may be of the R type. In this case, the signal processing system detects a MO signal on the basis of a light quantity detection signal from the first photodetector 67 to form servo signals, RF signal on the basis of respective light quantity detection signals from the second photodetector 68.

MO signal=(A+C)−(B+D)

Focus error signal=A−B

Tracking error signal=D−E

RF signal=A+B+C

Since such optical pick-up device according to the sixth embodiment uses only one polarization beam splitter, it is possible to provide a compact and inexpensive optical pick-up device through reduction of the optical path of incident light, etc. from reduction of the number of parts and simplification of configuration, and to obtain the same effects or advantages of the above-described optical pick-up device according to the first embodiment.

It is to be noted that, in the optical pick-up device according to the sixth embodiment, there may be employed the configuration in which the hologram film 63 and the bisected optical rotation plate 64 have the positional relationship opposite to the above.

Moreover, there may be employed the configuration in which the characteristic of polarization beam splitter film 62 of the polarization beam splitter 62 is caused to be the characteristic that it allows a light of P polarization component to be reflected and allows a light of S polarization component to be transmitted therethrough, and to allow an incident light to be incident through diffraction grating 61 from the incident plane of the side where first photodetector 67 shown in FIG. 11 is provided to receive a reflected light transmitted through the polarization beam splitter film by any means of any photodetector.

An optical pick-up device according to a seventh embodiment of this invention will now be described. It is to be noted that, in the description of the seventh embodiment, the same reference numerals are respectively attached to the portions which carry out the same operation in the above-described sixth embodiment, and their detailed explanation is omitted.

Figure 14:
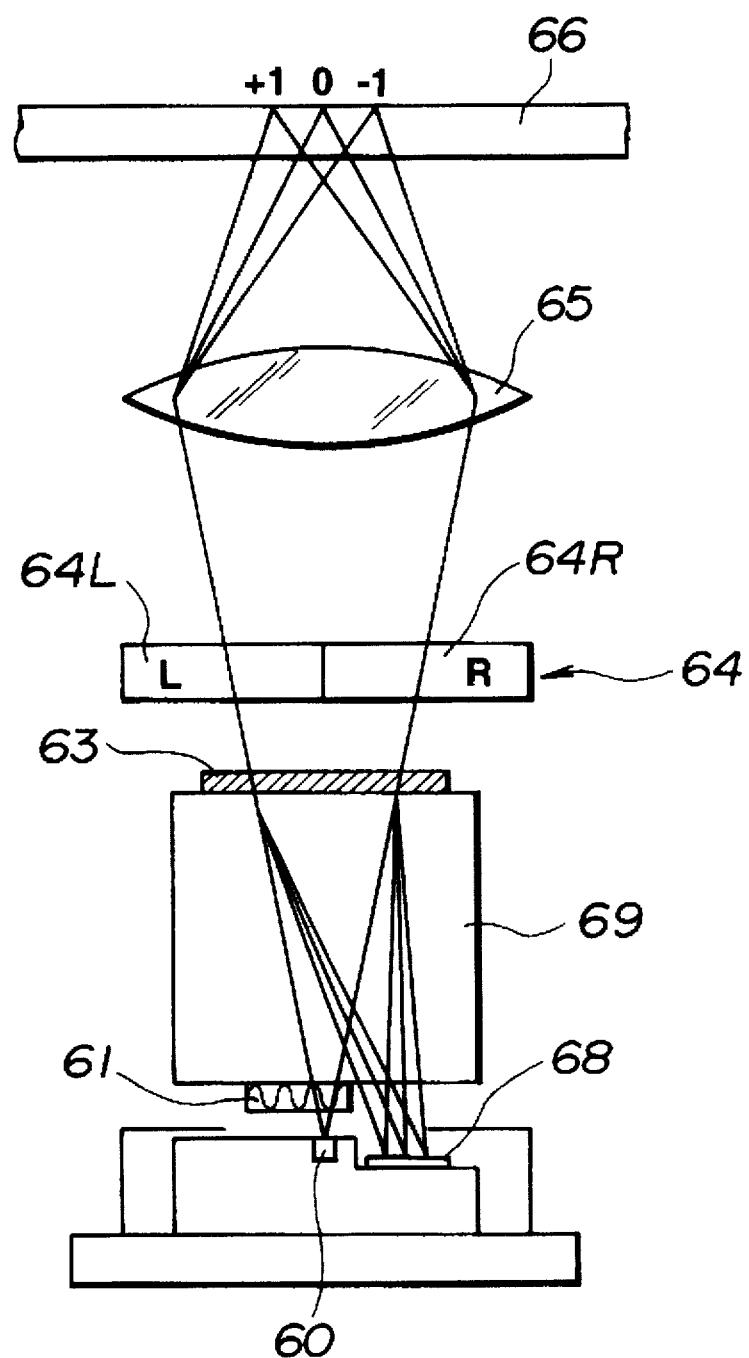
FIG. 14 is a view showing the configuration of an optical pick-up device according to a seventh embodiment of this invention.

In the optical pick-up device according to the seventh embodiment, an optical glass 69 is provided in place of the polarization beam splitter 62 as shown in FIG. 14. This optical glass 69 is a merely glass block adapted to allow a light incident thereto to be emitted as it is.

Further, the optical pick-up device according to the seventh embodiment is adapted to receive a reflected light caused to be through the optical glass 69 by means of the second photodetector.

As described above, the second photodetector 68 forms light quantity detection signals corresponding to rays of received reflected light to deliver these signals to the signal processing system.

In the case where a magneto-optical disc is provided as the optical disc 66, the signal processing system detects a MO signal on the basis of the following calculation formula by respective light quantity detection signals of light receiving areas A~C shown in FIG. 13(a).

$$MO\ signal = (A+B) - C$$

It is to be noted that focus error signal, tracking error signal and RF signal are detected by the same calculation formulas as those of the above-described optical pick-up device according to the sixth embodiment.

Such optical pick-up device according to the seventh embodiment can also provide the same effects or advantages as those of the above-described optical pick-up device according to the sixth embodiment.

Moreover, also in this case, there may be employed the configuration in which the hologram film 63 and the bisected optical rotation plate 64 have the positional relationship opposite to the above.

In addition, there may be employed the configuration in which the optical glass 69 is omitted to hold the hologram film 63 and the diffraction grating 61 by means of wire, etc.

An optical pick-up device according to an eighth embodiment of this invention will now be described. It is to be noted that the same reference numerals are respectively attached to the portions which carry out the same operations as those of the above-described optical pick-up device according to the sixth embodiment, and their detailed explanation is omitted.

Figure 15:
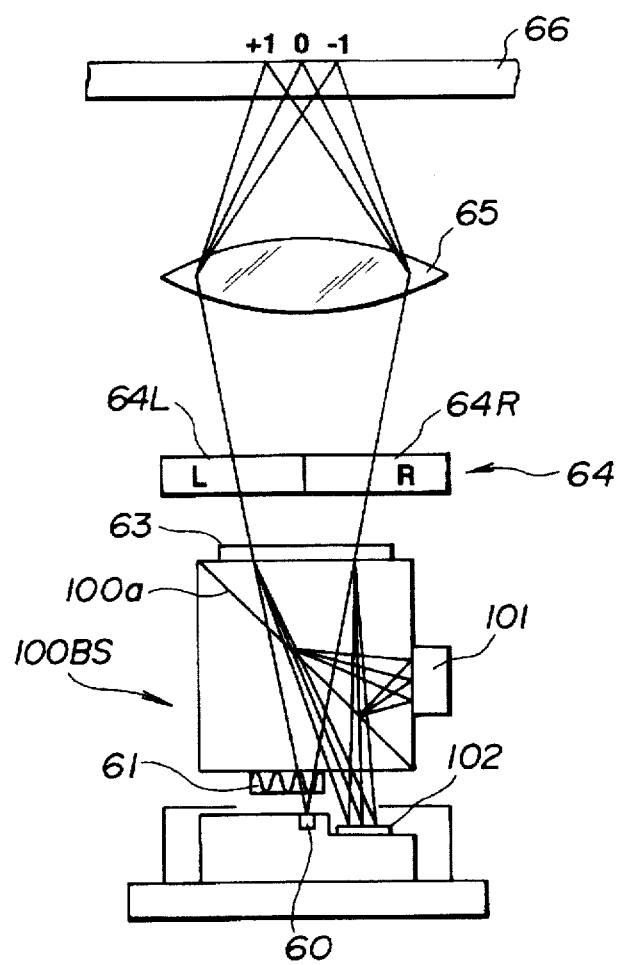
FIG. 15 is a view showing the configuration of an optical pick-up device according to an eighth embodiment of this invention.

Namely, in the optical pick-up device according to the eighth embodiment, a beam splitter 100 is provided in place of the polarization beam splitter 62 as shown in FIG. 15.

In this case, respective rays of reflected light of which optical paths have been changed by the hologram film 63 are reflected by the beam splitter 100 by a predetermined quantity to receive the reflected light by a first photodetector 101, and to receive, by a second photodetector 102, the remaining respective rays of reflected light which have been transmitted through the beam splitter 100.

Figure 16:
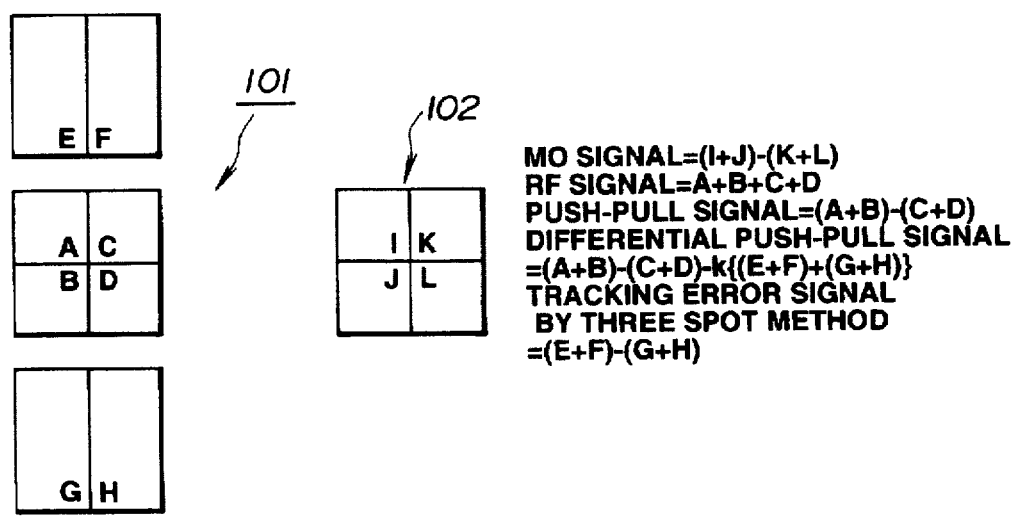
FIG. 16 is a view for explaining the configuration of first and second photodetectors provided in the optical pick-up device according to the eighth embodiment.

The first photodetector 101 is composed, as shown in FIG. 16, of a four division photodetector having light receiving areas A~D, which is adapted for receiving a reflected light of the 0-th order light of respective rays of reflected light reflected by the beam splitter 100, and bisected photodetectors respectively having light receiving areas E, F, and G, H, which are adapted for receiving rays of reflected light of the ±1-th order light.

Moreover, the second photodetector 102 is comprised, as shown in the FIG. 16 mentioned above, of a four division photodetector having light receiving areas I~L, which is adapted for receiving a reflected light of the 0-th order light of rays of reflected light which have been transmitted through the beam splitter 100.

These photodetectors 101, 102 respectively form light quantity detection signals corresponding to light quantities of reflected light received at the light receiving areas A~L to deliver these signals to the signal processing system.

In the case where a magneto-optical disc is provided as the optical disc 66, the signal processing system detects a RF signal, a push-pull signal and a differential push-pull signal by respective light quantity detection signals A~H from the first photodetector 101 to detect a focus error signal and a MO signal by respective light quantity detection signals I~L from the second photodetector 102.

$$RF\ signal = A+B+C+D$$

$$Push\text{-}Pull\ signal = (A+B)-(C+D)$$

$$DPP\ signal = [(A+B)-(C+D)] - K[(E-F)+(G+H)]$$

$$MO\ signal = (I+J)-(K+L)$$

$$Focus\ error\ signal = (I+L)-(K+J)$$

Alternatively, in the case where an optical disc except for a magneto-optical disc where grooves are provided along recording tracks, such as, for example compact disc, etc. is provided as the optical disc 66, the signal processing system detects a RF signal and a tracking error signal by respective light quantity detection signals A~H from the first photodetector 101 to detect a focus error signal by respective light quantity detection signals I~L from the second photodetector 102.

$$RF\ signal = A+B+C+D$$

$$Tracking\ error\ signal = (E+F)-(G+H)$$

$$Focus\ error\ signal = (I+L)-(K+J)$$

Such optical pick-up device according to the eighth embodiment can also provide the same effects or advantages as those of the above-described optical pick-up device according to the sixth embodiment.

Further, also in this case, there may be employed the configuration in which the hologram film 63 and the bisected optical rotation plate 64 have the positional relationship opposite to the above.

In addition, there may be employed the configuration adapted for allowing an incident light to be incident from the first photodetector 101 side of FIG. 15 and allowing a reflected light to be received at the second photodetector 102 side.

An optical pick-up device according to a ninth embodiment of this invention will now be described.

Figure 17:
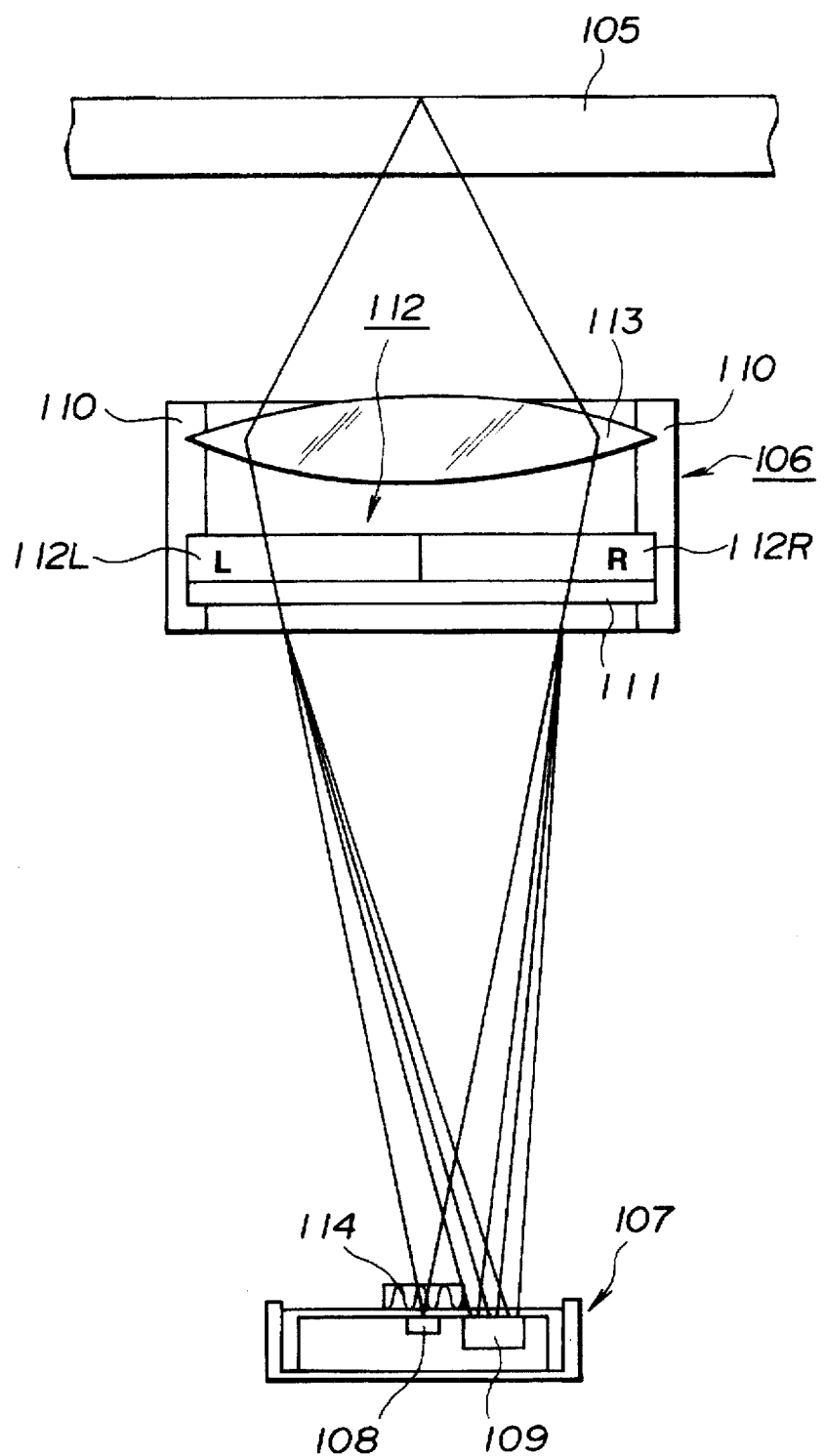
FIG. 17 is a view showing the configuration of an optical pick-up device according to a ninth embodiment of this invention.

The optical pick-up device according to the ninth embodiment is composed, as shown in FIG. 17, of a movable unit 106 and a laser module 107 provided with the optical axis of a reflected light being as the center.

The movable unit 106 is constituted by holding a hologram film 111 adapted to allow an incident light to be transmitted therethrough as it is and to emit a reflected light in the state where the optical path is changed, and a bisected optical rotation plate 112 of the same structure as the bisected optical rotation plate 5 provided in the above-described optical pick-up device according to the first embodiment, and an object lens (objective) 113 by means of a holding section 110 to allow them to be integral (in one body).

Moreover, the laser module 107 is constituted by allowing a laser light source 108 for emitting an incident light, a diffraction grating 114 for trisecting (dividing) an incident light from the laser light source 108 into rays of incident light of the 0-th order light, and rays of incident light of the ±1-th order light, and a photodetector 109 provided in the vicinity of the laser light source 108 so as to receive respective rays of reflected light of which optical paths have been changed by the hologram film 111 to be integral with each other.

The operation of the optical pick-up device according to the ninth embodiment constituted as above will now be described.

Initially, an incident light from the laser light source 108 is trisected (divided) into rays of incident light of the 0-th order light and rays of incident light of the ±1-th order light, and those rays of light are incident to the hologram film 111. The hologram film 111 emits the rays of incident light as they are without changing their optical paths. Respective rays of incident light caused to be through the hologram film 111 are incident to the bisected optical rotation plate 112.

The bisected optical rotation plate 112 optically rotates the respective rays of incident light in clockwise direction or in counterclockwise direction at the right side and the left side with the optical axis being as the boundary similarly to the above to allow them to be incident to the object lens 113. The object lens 113 converges the respective rays of incident light to irradiate them onto the optical disc 105.

Then, respective rays of reflected light produced as the result of the fact that respective rays of incident light are irradiated onto the optical disc 105 in this way are incident to the bisected optical rotation plate 112 through the object lens 113.

Since the optical path of the incident light and the optical path of reflected light are opposite to each other in traveling direction of light as described above, a light caused to be through right optical rotation plate 112R of the bisected optical rotation plate 112 at the stage of incident light is incident to the left optical rotation plate 112L at the stage of reflected light, and a light caused to be through the left optical rotation plate 112L of the bisected optical rotation plate 112 at the stage of incident light is incident to the right optical rotation plate 112R at the stage of reflected light. Thus, the respective rays of reflected light are caused to be a reflected light having both components of S polarization component and P polarization component, and are incident to the hologram film 111.

The hologram film 111 changes optical paths of the respective rays of reflected light by a predetermined quantity to irradiate these rays of light onto the photodetector 109 of the laser module 107.

Figure 13:
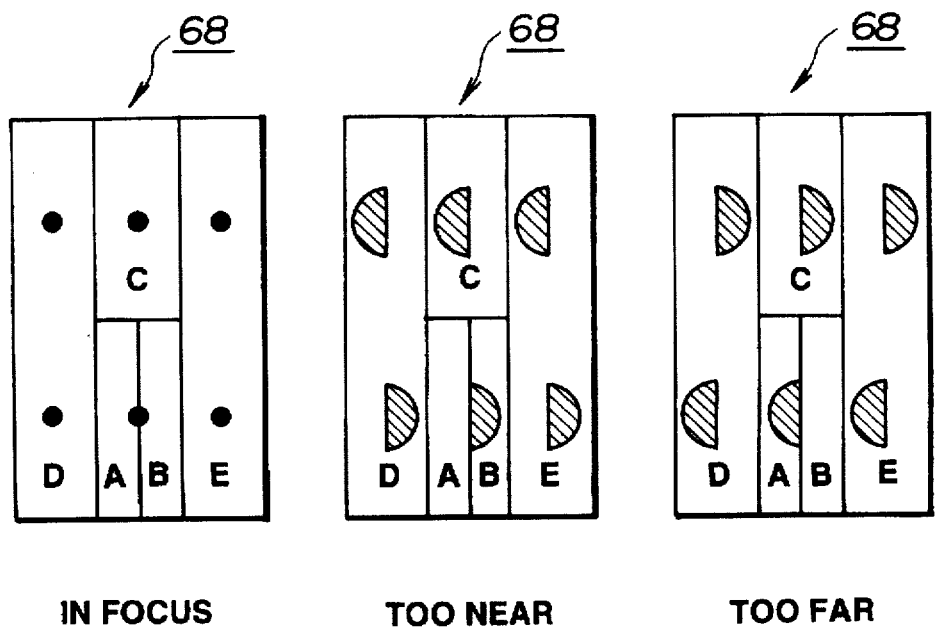
FIG. 13 is a view for explaining the configuration of a second photodetector provided in the optical pick-up device according to the sixth embodiment.

The photodetector 109 is a five division photodetector as explained in FIG. 13. At the time of just focus (in focus), rays of reflected light of dotted shape are irradiated as shown in FIG. 13(a). In the case where focus deviates toward the disc side, rays of reflected light of semicircular shape are irradiated in respective light receiving area A~E as shown in FIG. 13(b). In the case where focus deviates to the side opposite to the disc, rays of reflected light of semicircular shape opposite to the above are irradiated into respective light receiving areas A~E as shown in FIG. 13(c). This photodetector 109 forms light quantity detection signals corresponding to light quantities of reflected light received at the respective light receiving areas A~E to deliver these signals to the signal processing system.

In the case where a magneto-optical disc is provided as the optical disc 105, the signal processing system detects a MO signal, a RF signal, a focus error signal and a push-pull signal by the following calculation formulas on the basis of respective light quantity detection signals from the respective light receiving areas A~E.

*MO signal=(A+B)−C*

*RF signal=A+B+C*

Focus error signal=A−B

Push-pull signal=D−E

Alternatively, in the case where an optical disc except for a magneto-optical disc where grooves are provided along recording tracks, such as, for example, compact disc is provided as the optical disc 105, the signal processing system detects a RF signal, a focus error signal, and a tracking error signal by the following calculation formulas on the basis of respective light quantity detection signals from the respective light receiving areas A~E.

*RF signal=A+B+C*

Focus error signal=A−B

Tracking error signal=D−E

Such optical pick-up device according to the ninth embodiment can also provide the same effects or advantages as those of the optical pick-up device according to the first embodiment.

An optical pick-up device according to a tenth embodiment of this invention will now be described.

Figure 18:
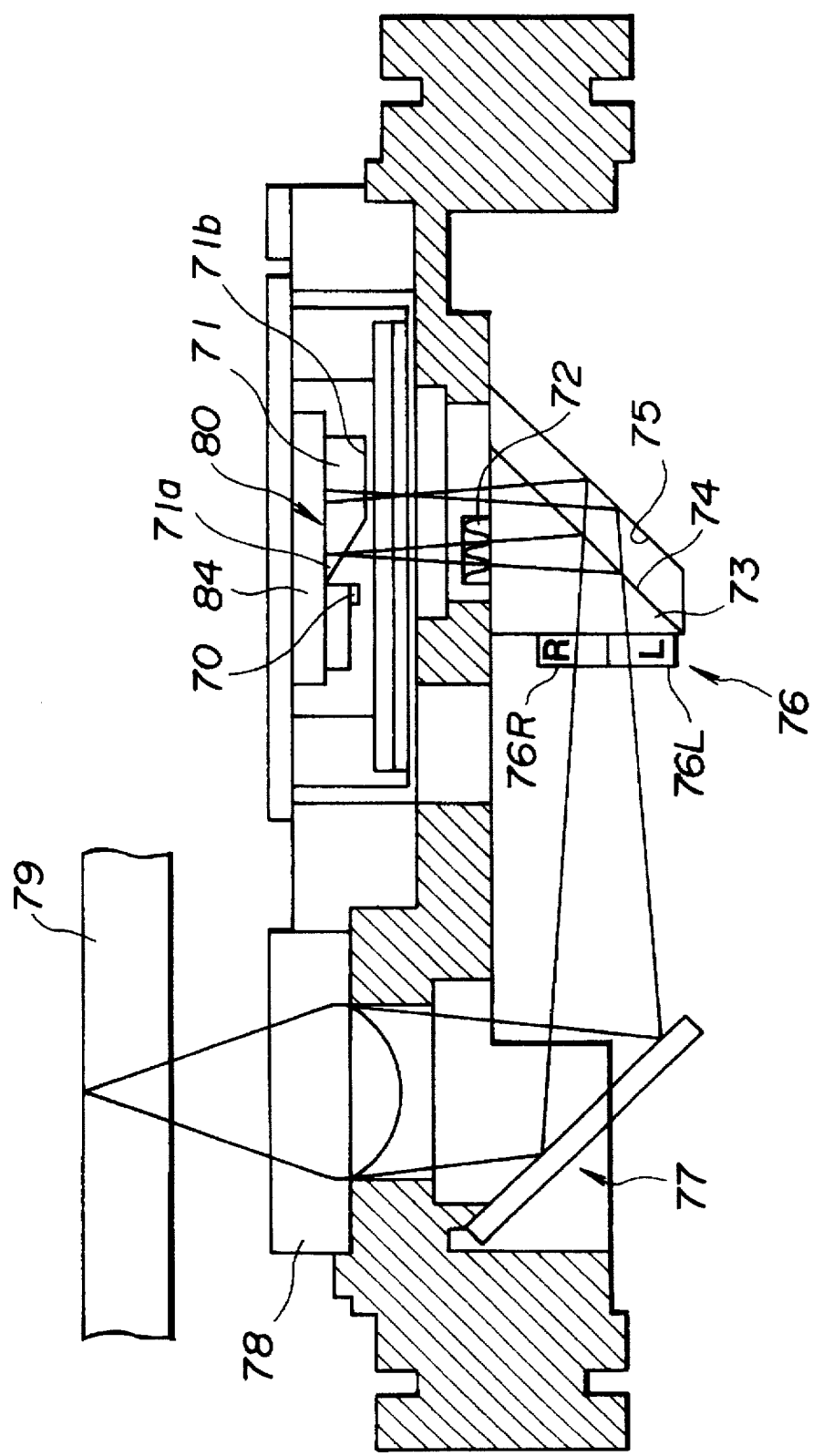
FIG. 18 is a view showing the configuration of an optical pick-up device according to a tenth embodiment of this invention.

The optical pick-up device according to the tenth embodiment includes, as shown in FIG. 18, a laser light source 70, and a micro prism 71 having an incident/reflection plane surface 71a adapted to allow an incident light from the laser light source 70 and a reflected light thereof to be transmitted therethrough by a predetermined quantity and to allow them to be reflected by a predetermined quantity, and an incident plane surface 71b to which the incident light is incident. Moreover, this optical pick-up device includes a diffraction grating 72 to which an incident light reflected on the incident/reflection plane surface 71a of the micro prism 71 is incident, and an optical block 73 in which a polarization beam splitter film 74 adapted to allow light of P polarization component to be reflected and to allow light of S polarization component to be transmitted therethrough and a total reflection film 75 are provided in parallel to each other. In addition, the optical pick-up device further comprises a bisected optical rotation plate 76 provided at the emitting plane of the incident light of the optical block 73, a reflection mirror 77 for totally reflecting an incident light from the bisected optical rotation plate 76, and an object lens (objective) 78 for converging rays of an incident light reflected by the total reflection mirror 77 to irradiate them onto the optical disc 79.

At the portion where a reflected light caused to be through the incident/reflection plane surface 71a is emitted and the portion where a reflected light caused to be through the incident plane surface 71b is emitted of the micro prism, photodetectors 80 are respectively provided. In addition, the photodetectors 80, the micro-prism 71 and the laser light source 70 are provided on the same substrate (base) 84.

The operation of the optical pick-up device according to the tenth embodiment will now be described.

In the optical pick-up device according to the tenth embodiment, an incident light emitted from the laser light source 70 is irradiated onto the incident/reflection plane surface 71a of the micro-prism 71. The rays of light thus irradiated are transmitted therethrough by a predetermined quantity and are reflected by a predetermined quantity by the incident/reflection plane surface 71a. The incident light reflected by the incident/reflection plane surface 71a is incident to the diffraction grating 72.

The diffraction grating 72 trisects (divides) the incident light into rays of incident light of the 0-th order light and rays of incident light of the ±1-th order light to allow these rays of light to be incident to polarization beam splitter film 74 of the optical block 73.

The polarization beam splitter film 74 of the optical block 73 has the characteristic that it allows light of P polarization component to be reflected and allows light of S polarization component to be transmitted therethrough. For this reason, the respective rays of incident light are reflected by the polarization beam splitter film 74, and are incident to the bisected optical rotation plate 76.

The bisected optical rotation plate 76 has, e.g., the configuration of the same T type as that of the bisected optical rotation plate 5 of the optical pick-up device according to the first embodiment, and optically rotates, by right optical rotation plate 76R and left optical rotation plate 76L, respective rays of incident light incident thereto in clockwise direction or in counterclockwise direction with the optical axis being as the boundary to emit them. The respective rays of incident light caused to be through the bisected optical rotation plate 76 are totally reflected by the total reflection mirror 77. The rays of totally reflected light are converged by the object lens 78 and are irradiated onto the optical disc 79.

When the respective rays of reflected light are irradiated onto the optical disc 79 as stated above, rays of reflected light corresponding to rays of incident light are produced. These respective rays of reflected light are incident to the bisected optical rotation plate 76 through the object lens 78 and the total reflection mirror 77. In this instance, similarly to the above-described optical pick-up device according to the first embodiment, a light caused to be through the right optical rotation plate 76R at the stage of incident light is incident to the left optical rotation plate 76L at the stage of reflected light, and a light caused to be left optical rotation plate 76L at the stage of incident light is incident to the right optical rotation plate 76R at the stage of reflected light.

Thus, the respective rays of reflected light are emitted under the state where they are caused to have both components of P polarization component and S polarization component.

It is to be noted that, in the case where a magneto-optical disc is provided as the optical disc 79, an optical rotation angle rotated by the Kerr effect is added to optical rotation angles of respective rays of reflected light as described above.

Respective rays of reflected light caused to be through the bisected optical rotation plate 76 are incident to the polarization beam splitter film 74 of the optical block 73.

Figure 19:
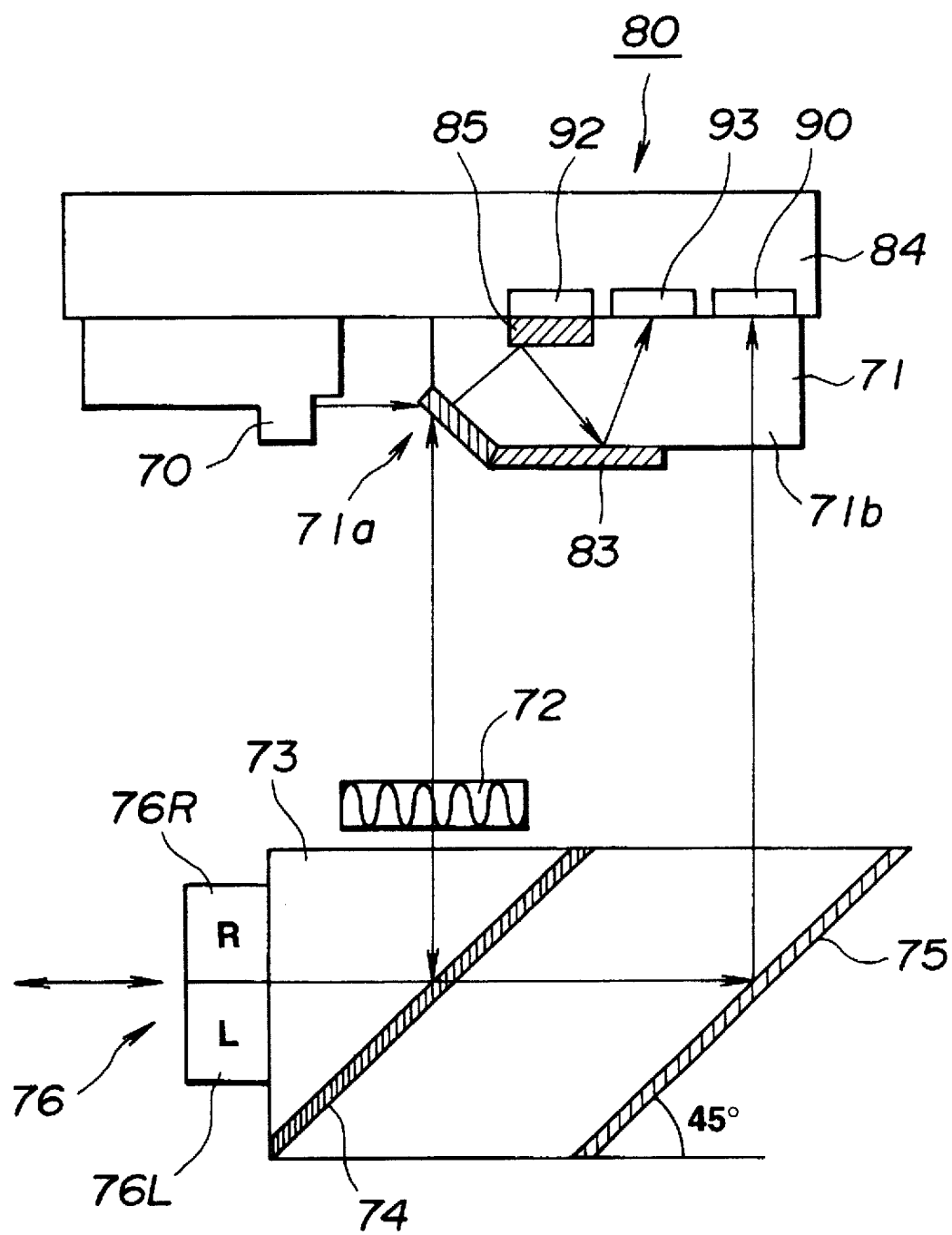
FIG. 19 is a view for explaining the configuration of an optical block and a micro prism provided in the optical pick-up device according to the tenth embodiment.

As described above, respective rays of reflected light caused to be through the bisected optical rotation plate 76 have both components of P polarization component and S polarization component. For this reason, in FIG. 19, a reflected light of P polarization component of respective rays of reflected light incident to the polarization beam splitter film 74 is reflected by the polarization beam splitter film 74, and is incident to the diffraction grating 72.

The diffraction grating 72 further forms rays of incident light of the 0-th order light and rays of incident light of the ±1-th order light from rays of reflected light of the 0-th order light and rays of reflected light of the ±1-th order light to emit them. Accordingly, nine rays of reflected light are emitted from the diffraction grating 72. These respective rays of reflected light are irradiated onto a half mirror 85 through the incident/reflection plane surface 71a of the micro prism 71.

The half mirror 85 allows substantially one half of the respective rays of reflected light to be transmitted therethrough and allows the remaining half to be reflected. The respective rays of reflected light which have been transmitted through the half mirror 85 are irradiated onto the photodetector 80. Moreover, the respective rays of reflected light reflected by the half mirror 85 are reflected by a total reflection film 83, and are irradiated onto the photodetector 80.

On the other hand, the respective rays of reflected light which have been transmitted through the polarization beam splitter film 74 are totally reflected by total reflection film 75 of the optical block 73, and are incident to the photodetector 80 through the incident plane surface 71b of the micro-prism 71.

Figure 20:
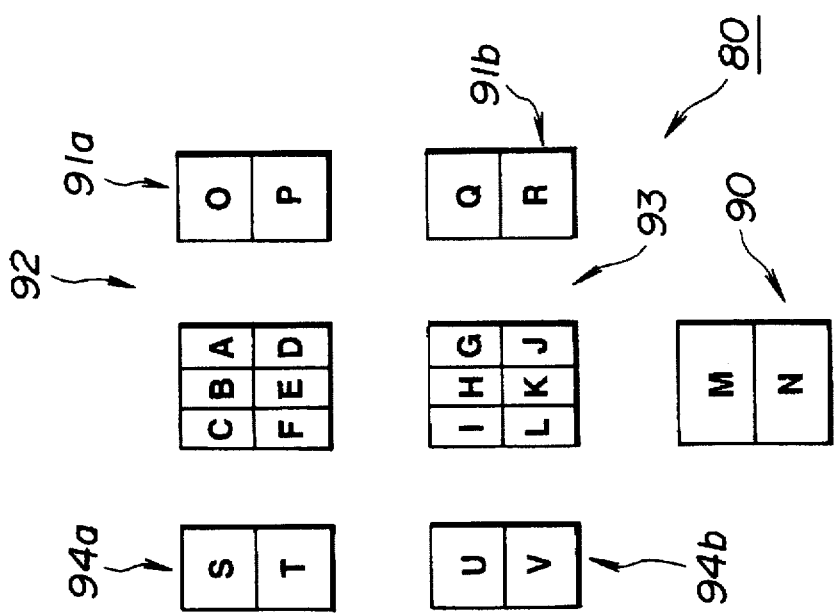
FIG. 20 is a view for explaining the configuration of a photodetector provided in the optical pick-up device according to the tenth embodiment.

The photodetector 80 includes, as shown in FIG. 20, a first photodetector 92 for receiving rays of reflected light of the 0-th order light of respective rays of reflected light transmitted through the half mirror 85 provided at the micro-prism 71, and second and third photodetectors 91a, 94a for receiving rays of reflected light of the ±1-th order light. Moreover, the photodetector 80 further includes a fourth photodetector 93 for receiving rays of reflected light of the 0-th order light of respective rays of reflected light reflected by the total reflection film 83 provided at the micro-prism 71, and fifth and sixth photodetectors 91b, 94b for receiving rays of reflected light of the ±1-th order light. Further, the photodetector 80 includes a seventh photodetector 90 for receiving rays of reflected light of the 0-th order light of respective rays of reflected light totally reflected by the total reflection film 75 of the optical block 73.

Light receiving areas of the first photodetector 92 and the fourth photodetector 93 are respectively divided into six light receiving areas A~F and six light receiving areas G~L. Moreover, light receiving areas of the second and third photodetectors 91a, 94a and the fifth and sixth photodetectors 91b, 94b are respectively divided into two light receiving areas O, P, two light receiving areas S, T, and two light receiving areas Q, R and two light receiving areas U, V. In addition, the light receiving area of the seventh photodetector 90 is divided into two light receiving areas M, N.

Such respective photodetectors 90, 91a, 91b, 92, 93, 94a, 94b form light quantity detection signals corresponding to light quantities of respective rays of reflected light received at respective light receiving areas A~V to deliver these signals to the signal processing system.

In the case where a magneto-optical disc is provided as the optical disc 79, the signal processing system detects a MO signal, a focus error signal, a push-pull signal, a differential push-pull signal, and a RF signal by the following calculation formulas on the basis of light quantity detection signals A~V from the respective photodetectors 90, 91a, 91b, 92, 93, 94a, 94b.

$MO\ signal = M - N$ $Focus\ error\ signal = (A+B+C+D+E+F) - (G+H+I+J+K+L)$ $Push\text{-}pull\ signal = (A+B+C+J+K+L) - (D+E+F+G+H+I)$ $DPP\ signal = [(A+B+C+J+K+L) - (D+E+F+G+H+I)] - K(O+P+Q+R+S+T+U+V)$ $RF\ signal = A+B+C+D+E+F+G+H+I+J+K+L$ Alternatively, in the case where an optical disc except for a magneto-optical disc where grooves are provided along recording tracks, such as, for example, compact disc is provided as the optical disc 79, the signal processing system detects a RF signal, a focus error signal, and a tracking error signal by the following calculation formulas on the basis of light quantity detection signals A~V from the respective photodetectors 90, 91a, 91b, 92, 93, 94a, 94b.

$RF\ signal = A+B+C+D+E+F+G+H+I+J+K+L$ $Focus\ error\ signal = (A+B+C+D+E+F) - (G+H+I+J+K+L)$ $Tracking\ error\ signal = (O+P+Q+R) - (S+T+U+V)$ Such optical pick-up device according to the tenth embodiment can also provide the same effects or advantages as those of the above-described optical pick-up device according to the first embodiment.

An optical pick-up device according to an eleventh embodiment of this invention will now be described. It is to be noted that, in the description of the optical pick-up device according to the eleventh embodiment, the same reference numerals are respectively attached to portions for carrying out the same operations as those of the above-described optical pick-up device according to the tenth embodiment.

Figure 21:
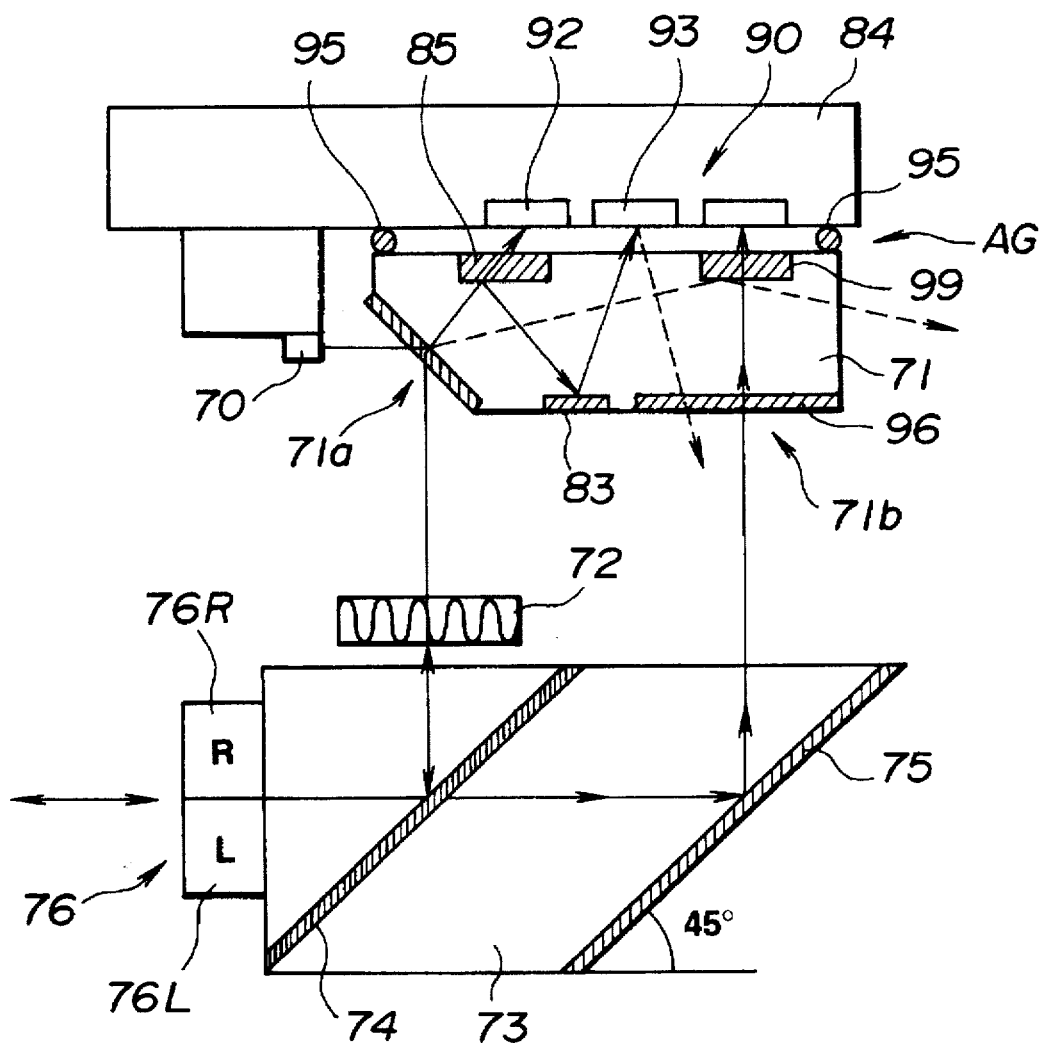
FIG. 21 is a view showing the configuration of an optical pick-up device according to an eleventh embodiment of this invention.
Figure 22:
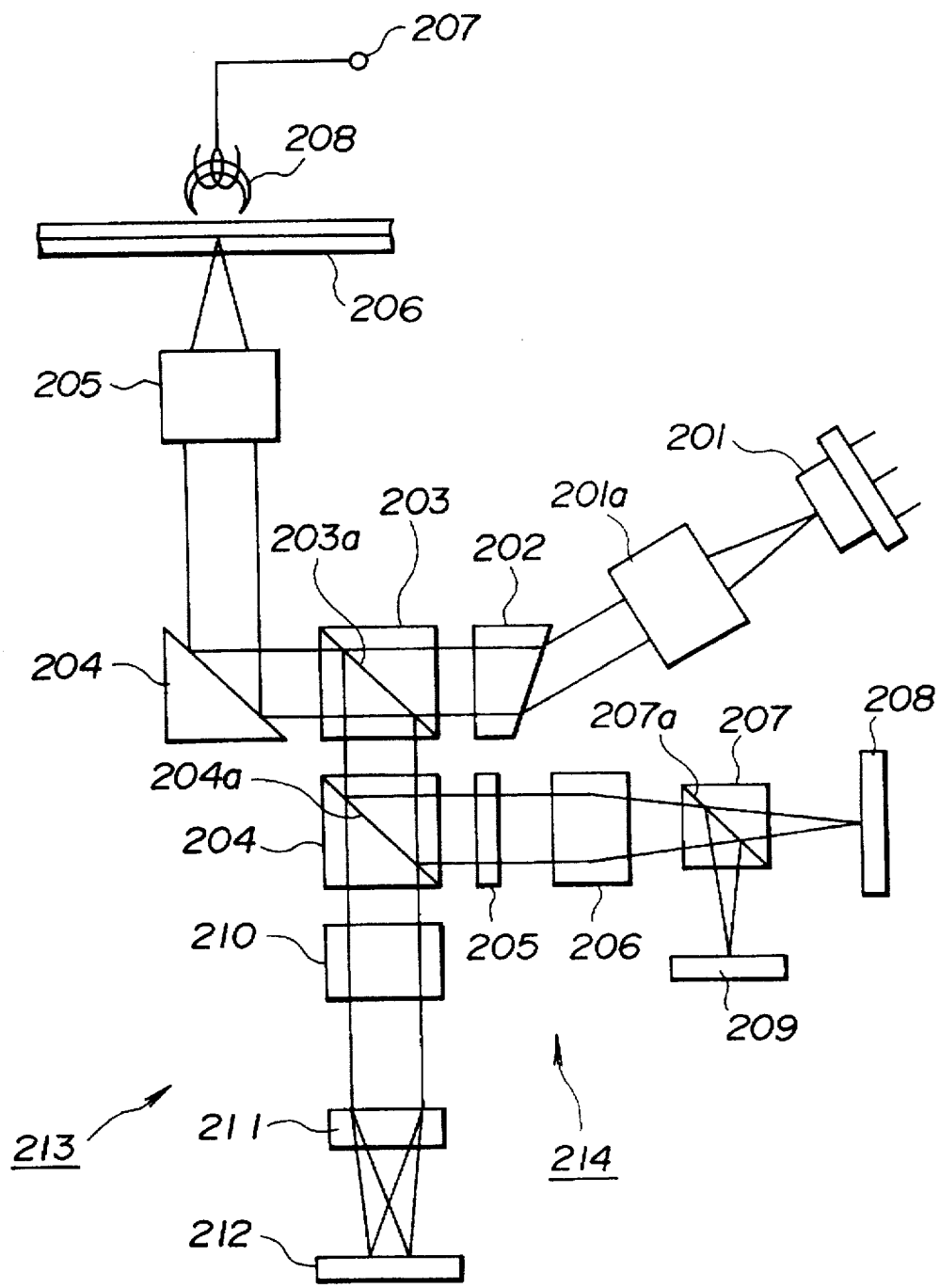
FIG. 22 is a view showing the configuration of a conventional optical pick-up device for magneto-optical disc.

In the optical pick-up device according to the eleventh embodiment, as shown in FIG. 21, indirect members 95 are respectively provided at the right end and the left end of the micro-prism 71, and the micro-prism 71 is provided on substrate (base) 84 through these indirect members 95 to thereby air gap (AG) between the micro-prism 71 and the substrate 84.

Moreover, at the portion where excess reflected light reflected onto the photodetector 93 of the micro-prism 71 is irradiated and the incident plane surface 71b, a total transmission film 96 is provided. At the portion where a reflected light incident from the incident plane surface 71b is emitted, there is provided a transmission film 99 adapted to allow a light having an incident angle less than a predetermined angle to be transmitted therethrough, and to allow a light having an incident angle of the predetermined angle or more to be reflected.

When such a configuration is employed, a reflected light reflected by the third photodetector 79 is emitted to the outside of the micro-prism 71 through the transmission film 96 as indicated by dotted lines in FIG. 21.

Moreover, an incident light incident into the micro-prism 71 through the incident/reflection plane surface 71a of the micro-prism 71 from the laser light source 70 is reflected by the transmission film 99 as indicated by dotted lines in FIG. 21, and is emitted to the outside of the micro-prism 71.

Accordingly, the optical pick-up device according to the eleventh embodiment can provide the same effects or advantages as those of the optical pick-up device according to the tenth embodiment. In addition, this optical pick-up device can prevent irregular reflection of an incident light from the laser light source 70 and a reflected light from the optical block 73, thus making it possible to prevent respective photodetectors 90, 91a, 91b, 92, 93, 94a, 94b from undergoing bad influence by such irregular reflection.

For this reason, it is possible to detect correct tracking error, focus error, MO signal or RF signal, etc.

It is to be noted that while, in the description of the above-described respective embodiments, explanation has been given by taking examples of actual numeric values as in the case of carrying out optical rotation, in the bisected optical rotation plate, in clockwise direction or in counterclockwise direction by 22.5 degrees at the right side and the left side with the optical axis of an incident light being as the center. However, this is merely one example, and it is therefore a matter of course that this invention may be diversely modified in accordance with embodiments within the range which does not depart from the technical idea according to this invention.

As is clear from the foregoing description, the optical pick-up device according to this invention trisects (divides) an incident light from a laser light source into rays of incident light of the 0-th order light and rays of incident light of the ±1-th order light by diffraction means, and independently optically rotate respective rays of incident light at the right side and the left side with the optical axis being as the boundary by optical rotation means to irradiate them onto the optical disc to receive rays of reflected light thereof, thus to carry out detection of recording information and servo information.

Thus, it is possible to detect recording information and servo information by so called three spot method, thus making it possible to cope with all (various) optical discs such as magneto-optical disc, compact disc or video disc, etc.

In addition, the polarization beam splitter can be completely omitted or it is sufficient to provide only one polarization beam splitter, thus making it possible to provide a compact and inexpensive optical pick-up device through reduction of the optical path of incident light, etc. from reduction of the number of parts and simplification of the configuration.

What is claimed is:

1. An optical pick-up device comprising:
   a laser light source for emitting laser beams as an incident light;
   diffraction means for separating the incident light into a 0-th order light, a +1-th order light and a −1-th order light spaced by predetermined distances in a radial direction of an optical disc;
   optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light;
   a lens member interposed between the optical rotation means and the optical disc, and adapted to converge rays of the incident light which has been passed through the optical rotation means to irradiate them onto the optical disc and to allow rays of a reflected light produced as the result of the fact that those rays of the incident light are irradiated onto the optical disc to be transmitted therethrough,
   a polarization beam splitter interposed between the diffraction means and the optical rotation means, and adapted to allow a light of a predetermined polarization component of the laser beams incident thereto to be passed therethrough and to allow a light of a polarization component perpendicular to the predetermined polarization component to be reflected to thereby emit the incident light and the reflected light in different directions; and
   detecting means adapted to receive the reflected light separated from the incident light by the polarization beam splitter to detect at least a magneto-optical signal and a tracking error signal in dependency upon the light receiving result.

2. An optical pick-up device as set forth in claim 1, wherein the detecting means includes:
   first light receiving means consisting of at least two light receiving areas, which is adapted to receive the 0-th order light,
   second light receiving means consisting of two light receiving areas, which is adapted to receive the +1-th order light, and
   third light receiving means consisting of two light receiving areas, which is adapted to receive the −1-th order light.

3. An optical pick-up device as set forth in claim 2, wherein the optical rotation means is divided by a boundary line in correspondence with the track direction of the optical disc.

4. An optical pick-up device as set forth in claim 2, wherein the optical rotation means is divided by a boundary line in correspondence with the radial direction of the optical disc.

5. An optical pick-up device comprising:

a laser light source for emitting laser beams as an incident light;

diffraction means for separating the incident light into a 0-th order light, a +1-th order light and −1-th order light spaced by predetermined distances in a radial direction of an optical disc;

optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light;

a lens member interposed between the optical rotation means and the optical disc, and adapted to converge rays of the incident light which has been passed through the optical rotation means to irradiate those rays of light onto the optical disc, and to allow rays of a reflected light produced as the result of the fact that those rays of reflected light are irradiated onto the optical disc to be transmitted therethrough;

a polarization beam splitter interposed between the diffraction means and the optical rotation means, and adapted to allow a light of a predetermined polarization component of the laser beams incident thereto to be passed therethrough and to allow a light of a polarization component perpendicular to the predetermined polarization component to be reflected to thereby emit the incident light and the reflected light in different directions;

a beam splitter interposed between the diffraction means and the polarization beam splitter, and adapted to allow a predetermined quantity of the laser beams incident thereto to be reflected and to allow a predetermined quantity thereof to be transmitted therethrough;

first detecting means adapted to receive the reflected light separated from the incident light by the polarization beam splitter to detect at least a magneto-optical signal in dependency upon the light receiving result; and second detecting means adapted to receive the reflected light reflected by the beam splitter to detect at least a tracking error signal in dependency upon the light receiving result.

6. An optical pick-up device as set forth in claim 5, wherein the first detecting means includes light receiving means consisting of at least two light receiving areas, which is adapted to receive the 0-th order light, and wherein the second detecting means includes first light receiving means consisting of at least four light receiving areas, which is adapted to receive the 0-th order light, second light receiving means consisting of two receiving areas, which is adapted to receive the +1-th order light, and third light receiving means consisting of two light receiving areas, which is adapted to receive the −1-th order light.

7. An optical pick-up device as set forth in claim 6, wherein the optical rotation means is divided by a boundary line in correspondence with the track direction of the optical disc.

8. An optical pick-up device as set forth in claim 6, wherein the optical rotation means is divided by a boundary line in correspondence with the radial direction of the optical disc.

9. An optical pick-up device comprising:

a laser light source for emitting laser beams as an incident light, diffraction means for separating the incident light into a 0-th order light, a +1-th order light and a −1-th order light spaced by predetermined distances in a radial direction of an optical disc;

optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light, a lens member interposed between the optical rotation means and the optical disc and adapted to converge rays of an incident light which has been passed through the optical rotation means to irradiate those rays of incident light onto the optical disc, and to allow rays of a reflected light produced as the result of the fact that those rays of the incident light are irradiated onto the optical disc to be transmitted therethrough;

an optical block having a polarization beam splitter film interposed between the diffraction means and the optical rotation means and adapted to allow a light of a predetermined polarization component of the laser beams incident thereto to be passed therethrough and to allow a light of a polarization component perpendicular to the predetermined polarization component to be reflected to thereby emit the incident light and the reflected light in different directions, and a beam splitter film interposed in parallel to the polarization beam splitter film between the polarization beam splitter film and the diffraction means and adapted to allow a predetermined quantity of the laser beams incident thereto to be reflected and to allow a predetermined quantity thereof to be passed therethrough;

first detecting means adapted to receive a reflected light separated from the incident light by the polarization beam splitter film of the optical block to detect at least a magneto-optical signal and a tracking error signal by the three spot method in dependency upon the light receiving result; and second detecting means adapted to receive the reflected light reflected by the beam splitter film of the optical block to detect at least a tracking error signal by the push-pull method in dependency upon the light receiving result.

10. An optical pick-up device as set forth in claim 9, wherein the first detecting means includes first light receiving means consisting of at least eight light receiving areas, which is adapted to receive the 0-th order light, second light receiving means consisting of two light receiving areas, which is adapted to receive the +1-th order light, and third light receiving means consisting of two light receiving areas, which is adapted to receive the −1-th order light, and wherein the second detecting means includes first light receiving means consisting of at least four light receiving areas, which is adapted to receive the 0-th order light, second light receiving means consisting of two light receiving areas, which is adapted to receive the +1-th order light, and third light receiving means consisting of two light receiving areas, which is adapted to receive the −1-th order light.

11. An optical pick-up device as set forth in claim 10, wherein the optical rotation means is divided by a boundary line in correspondence with the track direction of the optical disc.

12. An optical pick-up device as set forth in claim 10, wherein the optical rotation means is divided by a boundary line in correspondence with the radial direction of the optical disc.

13. An optical pick-up device comprising:

a laser light source for emitting laser beams as an incident light;

diffraction means for separating the incident light into a 0-th order light, a +1-th order light and −1-th order light spaced by predetermined distances in a radial direction of an optical disc;

optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light;

a lens member interposed between the optical rotation means and the optical disc and adapted to converge rays of the incident light which has been passed through the optical rotation means to irradiate those rays of incident light onto the optical disc, and to allow rays of a reflected light produced as the result of the fact that those rays of the incident light are irradiated onto the optical disc to be transmitted therethrough;

hologram means interposed between the diffraction means and the optical rotation means and adapted to emit the incident light without changing the optical path and to emit the reflected light in the state where the optical path is changed by a predetermined quantity;

a polarization beam splitter interposed between the hologram means and the diffraction means and adapted to allow a light of a predetermined polarization component of the laser beams incident thereto to be passed therethrough and to allow a light of a polarization component perpendicular to the predetermined polarization component to be reflected to thereby emit the incident light and the reflected light in different directions;

first detecting means adapted to receive a reflected light reflected by the polarization beam splitter to detect at least a magneto-optical signal in dependency upon the light receiving result; and second detecting means adapted to receive a reflected light which has been caused to undergo change of the optical path by the hologram means and has been transmitted through the polarization beam splitter to detect at least a tracking error signal in dependency upon the light receiving result.

14. An optical pick-up device as set forth in claim 13, wherein the first detecting means is composed of at least two light receiving areas, which is adapted to receive the 0-th order light, and wherein the second detecting means includes first light receiving means consisting of at least three light receiving areas, which is adapted to receive the 0-th order light, second light receiving means for receiving the +1-th order light, and third light receiving means for receiving the −1-th order light.

15. An optical pick-up device as set forth in claim 14, wherein the optical rotation means is divided by a boundary line in correspondence with the track direction of the optical disc.

16. An optical pick-up device as set forth in claim 14, wherein the optical rotation means is divided by a boundary line in correspondence with the radial direction of the optical disc.

17. An optical pick-up device comprising:

a laser light source for emitting laser beams as an incident light;

diffraction means for separating the incident light into a 0-th order light, a +1-th order light and −1-th order light spaced by predetermined distances in a radial direction of an optical disc;

optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light;

a lens member interposed between the optical rotation means and the optical disc and adapted to converge rays of the incident light which has been passed through the optical rotation means to irradiate those rays of incident light onto the optical disc, and to allow rays of a reflected light produced as the result of the fact that those rays of the incident light are irradiated onto the optical disc to be transmitted therethrough;

hologram means interposed between the diffraction means and the optical rotation means and adapted to emit the incident light without changing the optical path and to emit the reflected light in the state where the optical path is changed by a predetermined quantity;

a beam splitter interposed between the hologram means and the diffraction means and adapted to allow a predetermined quantity of laser beams to be reflected and to allow a predetermined quantity of laser beams to be passed therethrough;

first detecting means adapted to receive a reflected light reflected by the beam splitter to detect at least a tracking error signal in dependency upon the light receiving result; and second detecting means adapted to receive a reflected light which has been caused to undergo change of the optical path by the hologram means and has been transmitted through the beam splitter to detect at least a magneto-optical signal in dependency upon the light receiving result.

18. An optical pick-up device as set forth in claim 17,
wherein the first detecting means comprises first light receiving means consisting of at least four light receiving areas, which is adapted to receive the 0-th order light, second light receiving means consisting of at least two light receiving areas, which is adapted to receive the +1-th order light, and third light receiving means consisting of at least two light receiving areas, which is adapted to receive the −1-th order light, and wherein the second detecting means consists of at least two light receiving areas for receiving the 0-th order light.

19. An optical pick-up device as set forth in claim 18, wherein the optical rotation means is divided by a boundary line in correspondence with the track direction of the optical disc.

20. An optical pick-up device as set forth in claim 18, wherein the optical rotation means is divided by a boundary line in correspondence with the radial direction of the optical disc.

21. An optical pick-up device comprising:

a laser light source for emitting laser beams as an incident light;

diffraction means for separating the incident light into a 0-th order light, a +1-th order light and a −1-th order light spaced by predetermined distances in a radial direction of an optical disc;

optical rotation means composed of a right optical rotation section for rotating plane of polarization of an incident light incident thereto by a predetermined angle in a clockwise direction, and a left optical rotation section for rotating plane of polarization of an incident light incident thereto by a predetermined angle in a counterclockwise direction, wherein the right optical rotation section and the left optical rotation section are divided by a boundary line passing through the optical axis of the incident light;

a lens member interposed between the optical rotation means and the optical disc and adapted to converge rays of the incident light which has been passed through the optical rotation means to irradiate those rays of incident light onto the optical disc, and to allow rays of a reflected light produced as the result of the fact that those rays of the incident light are irradiated onto the optical disc to be transmitted therethrough;

an optical block having a polarization beam splitter film interposed between the diffraction means and the optical rotation means and adapted to allow an incident light incident thereto through the diffraction means to be reflected, and a total reflection film provided substantially in parallel to the polarization beam splitter film and adapted to allow a reflected light incident through the optical rotation means and the polarization beam splitter film to be totally reflected;

a micro prism having an incident and reflection plane surface adapted to allow the incident light from the laser light source and the reflected light incident through the diffraction means to be respectively reflected by predetermined quantities and to allow them to be transmitted therethrough by predetermined quantities, and an incident plane surface to which a reflected light reflected on the total reflection plane surface is incident;

first detecting means adapted to receive a reflected light incident from the incident and reflection plane surface of the micro prism to detect at least a tracking error signal in dependency upon the light receiving result; and second detecting means adapted to receive a reflected light incident from the incident plane of the micro prism to detect at least a magneto-optical signal in dependency upon the light receiving result.

22. An optical pick-up device as set forth in claim 21,
wherein the micro prism includes half reflection means adapted to allow a reflected light incident into the micro prism through the incident and reflection plane surface to be transmitted therethrough by a predetermined quantity and to allow it to be reflected by a predetermined quantity, and total reflection means for totally reflecting a reflected light reflected by the half reflection means, wherein the first detecting means comprises first light receiving means consisting of at least six light receiving areas, which is adapted to receive the 0-th order light of a reflected light transmitted through the half reflection means, second light receiving means consisting of at least two light receiving areas, which is adapted to receive the +1-th order light, third light receiving means consisting of at least two light receiving areas, which is adapted to receive the −1-th order light, fourth light receiving means consisting of at least six light receiving areas, which is adapted to receive the 0-th order light of rays of a reflected light totally reflected by the total reflection means, fifth light receiving means consisting of at least two light receiving areas, which is adapted to receive the +1-th order light, and sixth light receiving means consisting of at least two light receiving areas, which is adapted to receive the −1-th order light, and wherein the second detecting means consists of at least two light receiving areas for receiving the 0-th order light of rays of a reflected light incident from the incident plane of the micro prism.

23. An optical pick-up device as set forth in claim 22, wherein the optical rotation means is divided by a boundary line in correspondence with the track direction of the optical disc.

24. An optical pick-up device as set forth in claim 22, wherein the optical rotation means is divided by a boundary line in correspondence with the radial direction of the optical disc.

* * * * *